US008501303B2

(12) United States Patent
Ohira et al.

(10) Patent No.: US 8,501,303 B2
(45) Date of Patent: Aug. 6, 2013

(54) AROMATIC POLYCARBONATE RESIN COMPOSITION

(75) Inventors: Yoji Ohira, Chiyoda-ku (JP); Toshiyuki Miyake, Chiyoda-ku (JP); Hiroshi Shuto, Chiyoda-ku (JP); Hiroshi Okamoto, Chiyoda-ku (JP); Takayuki Ozaki, Chiyoda-ku (JP); Maiko Murai, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 13/502,841

(22) PCT Filed: Oct. 18, 2010

(86) PCT No.: PCT/JP2010/068784
§ 371 (c)(1),
(2), (4) Date: Jun. 14, 2012

(87) PCT Pub. No.: WO2011/049228
PCT Pub. Date: Apr. 28, 2011

(65) Prior Publication Data
US 2012/0251785 A1  Oct. 4, 2012

(30) Foreign Application Priority Data
Oct. 19, 2009 (JP) .................. 2009-240450
Dec. 2, 2009 (JP) .................. 2009-274504

(51) Int. Cl.
*A61K 9/28* (2006.01)
*C08C 1/14* (2006.01)

(52) U.S. Cl.
USPC .......................... 428/156; 524/161; 524/165

(58) Field of Classification Search
USPC .................. 428/156; 524/161, 165
See application file for complete search history.

(56) References Cited

U.S. PATENT DOCUMENTS 3,971,756 A    7/1976  Bialous et al.
6,727,303 B2 * 4/2004  Ono et al. ..................... 524/261

FOREIGN PATENT DOCUMENTS

| JP | 60-38419 | 8/1985 |
| JP | 06-306265 | 11/1994 |
| JP | 06-336547 | 12/1994 |
| JP | 7-258532 | 10/1995 |
| JP | 09-169914 | 6/1997 |
| JP | 10-139964 | 5/1998 |
| JP | 3129374 | 11/2000 |
| JP | 3163596 | 5/2001 |
| JP | 2003-147190 | 5/2003 |
| JP | 2007-031583 | 2/2007 |
| JP | 2009-209253 | 9/2009 |

OTHER PUBLICATIONS

International Search Report issued Dec. 28, 2010 in International (PCT) Application No. PCT/JP2010/068784, of which the present application is the national stage.
International Preliminary Report on Patentability and Written Opinion issued May 15, 2012 in International (PCT) Application No. PCT/JP2010/068784, of which the present application is the national stage.

* cited by examiner

*Primary Examiner* — Terressa Boykin
(74) *Attorney, Agent, or Firm* — Wenderoth, Lind & Ponack, L.L.P.

(57) ABSTRACT

A resin composition comprising an aromatic polycarbonate resin having excellent transparency and flame retardancy. The resin composition comprises 100 parts by weight of an aromatic polycarbonate resin having a branched structure with a branching ratio of 0.7 to 1.1 mol % (component A) and 0.005 to 12 parts by weight of at least one flame retardant.

12 Claims, 1 Drawing Sheet

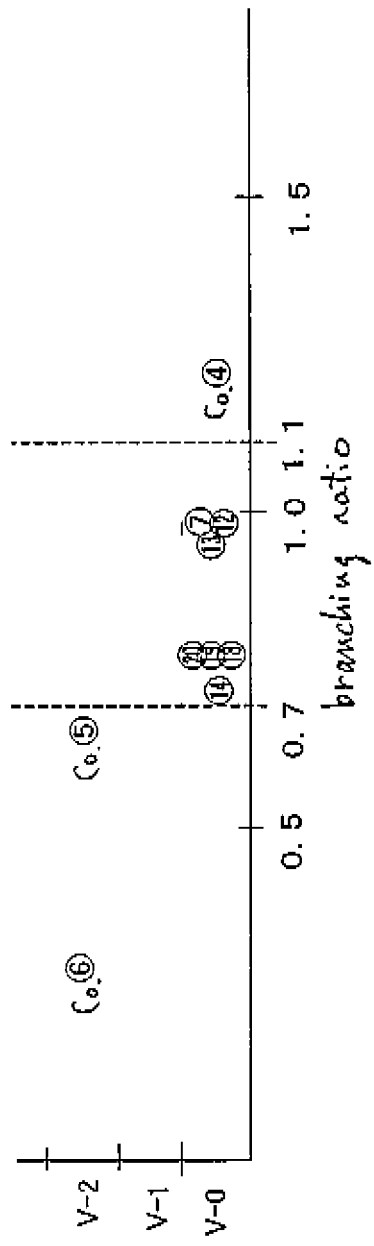
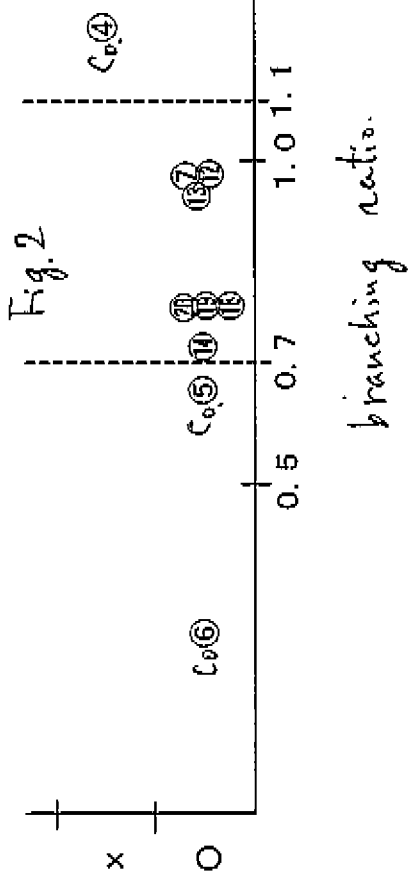

AROMATIC POLYCARBONATE RESIN COMPOSITION

TECHNICAL FIELD

The present invention relates to an aromatic polycarbonate resin composition. More specifically, it relates to an aromatic polycarbonate resin composition which has excellent flame retardancy while retaining high transparency.

BACKGROUND ART

Aromatic polycarbonate resins are used in a wide variety of industrial fields as a material for various molded articles. Especially for application fields in which high transparency is required, such as lighting covers and protective covers for transmission type displays, the aromatic polycarbonate resins are widely used, making use of excellent transparency typified by a high light transmittance and an extremely low haze. In these application fields, attention is now also paid to flame retardancy at the time of a fire, and a resin composition having high flame retardancy in addition to the above characteristic property is desired.

In order to provide flame retardancy to the aromatic polycarbonate resins, it has been proposed to add a bromine-based compound or a phosphorus-based compound, which is employed for OA equipment and home electric appliances all of which are strongly desired to be flame retarded. A flame retardant as a substitute for a bromine-based or phosphorus-based flame retardant has been developed and used in the above products. The purpose of changing the flame retardant is to suppress the generation of a corrosive gas at the time of molding or to improve the recyclability of a product.

An example of the flame retardant except for the bromine-based and phosphorus-based flame retardants is a silicone compound. A resin composition comprising the silicone compound and an aromatic polycarbonate resin is now under study energetically, and various proposals are made.

For example, there is proposed a method of mixing an alkali (earth) metal salt of a perfluoroalkylsulfonic acid and an organic siloxane having an alkoxy group, vinyl group and phenyl group with a polycarbonate resin (refer to Patent Document 1). There is also provided a method of mixing an alkali metal salt or alkali earth metal salt of a perfluoroalkylsulfonic acid and an organopolysiloxane containing an organosilyl group bonded to a silicon atom via a divalent hydrocarbon group with a polycarbonate resin (refer to Patent Document 2).

There is further proposed a method of mixing a specific petroleum-based heavy oil or pitch and a silicone compound with a resin component (refer to Patent Document 3). There is still further proposed a method of mixing a silicone resin having a unit represented by $R_2SiO_{1.0}$ and a unit represented by $RSiO_{1.5}$ (R is a hydrocarbon group) and a weight average molecular weight of 10,000 to 270,000 with a non-silicone resin having an aromatic ring (refer to Patent Document 4).

However, most of the above proposed resin compositions are unsatisfactory in terms of transparency and flame retardancy because they cannot achieve UL94 V-0 rating as they drip when they are thin, their molded articles become clouded due to the unsatisfactory dispersion of silicone, or transparency degrades after a moist heat treatment due to the agglomeration of silicone by the moist heat treatment.

To suppress dripping, use of polytetrafluoroethylene having fibril formability is effective. However, when polytetrafluoroethylene is mixed with an aromatic polycarbonate resin, the transparency of a molded article degrades due to incompatibility between polytetrafluoroethylene and the aromatic polycarbonate resin.

There is also proposed a resin composition which comprises an aromatic polycarbonate resin, an organic alkali metal salt and poly(methyl hydrogen siloxane) (refer to Patent Document 5). However, it cannot be said that the resin composition is satisfactory because it is clouded itself and a dispersion failure such as exfoliation occurs on the surface of a molded article. There is further proposed a resin composition which comprises an aromatic polycarbonate resin, an organic alkali metal salt and poly(phenylmethyl hydrogen siloxane) (refer to Patent Document 6).

There is still further proposed a resin composition which comprises a polycarbonate having a branched structure and an organic metal salt (refer to Patent Document 7). There is still further proposed a resin composition which comprises a polycarbonate having a branched structure, an organic metal salt and a specific siloxane compound (refer to Patent Documents 8 and 9). Although these resin compositions have excellent flame retardancy and transparency, the further improvement of flame retardancy is desired as the use of the polycarbonate is being diversified and products are becoming thinner.

Various flame retardant polycarbonate resin compositions have been developed according to application purpose and vary in flame retardancy level. It is desired that the flame retardancy levels of these materials should be improved as much as possible. For example, if the minimum thickness of a test specimen able to achieve V-0 flame retardancy in the UL94 standard that is widely used as a flame retardancy index for materials for electric applications can be reduced by 0.1 mm, its use as a flame retarding material becomes wide and its effect is extremely large. Even when the flame retardancy level is the same, if the amount of a flame retardant in use can be made as small as possible, this leads to the reduction of a gas generated at the time of processing, the improvement of workability, the stability of quality and the improvement of physical properties all of which are strongly desired.

(Patent Document 1) JP-A 6-306265
(Patent Document 2) JP-A 6-336547
(Patent Document 3) JP-A 9-169914
(Patent Document 4) JP-A 10-139964
(Patent Document 5) JP-B 60-38419
(Patent Document 6) JP-A 2003-147190
(Patent Document 7) Japanese Patent No. 3129374
(Patent Document 8) Japanese Patent No. 3163596
(Patent Document 9) JP-A 2007-31583

DISCLOSURE OF THE INVENTION

It is an object of the present invention to provide a composition which comprises an aromatic polycarbonate resin and is excellent in transparency and flame retardancy.

The inventors of the present invention have conducted intensive studies to attain the above object and have found that a resin composition having excellent flame retardancy as well as excellent transparency and impact resistance is obtained by combining a polycarbonate resin having a branched structure with a limited branching ratio and a flame retardant. The present invention has been accomplished based on this finding.

According to the present invention, there are provided the following inventions.

1. A resin composition comprising 100 parts by weight of an aromatic polycarbonate resin having a branched structure with a branching ratio of 0.7 to 1.1 mol % (component A) and 0.005 to 12 parts by weight of a flame retardant.
2. The resin composition in the above paragraph 1, wherein the flame retardant is at least one selected from the group consisting of a silicone compound having an aromatic group (component B) and an alkali (earth) metal salt (component C).
3. The resin composition in the above paragraph 2 which comprises the component B in an amount of 0.1 to 2 parts by weight based on 100 parts by weight of the component A.
4. The resin composition in the above paragraph 2, wherein the component B is a silicone compound having an Si—H group in the molecule.
5. The resin composition in the above paragraph 2 which comprises the component C in an amount of 0.005 to 1.0 part by weight based on 100 parts by weight of the component A.
6. The resin composition in the above paragraph 2, wherein the component C is at least one selected from the group consisting of an alkali (earth) metal salt of a perfluoroalkylsulfonic acid, an alkali (earth) metal salt of an aromatic sulfonic acid and an alkali (earth) metal salt of an aromatic imide.
7. The resin composition in the above paragraph 1, wherein the flame retardant is a mixture of a silicone compound having an aromatic group (component B) and an alkali (earth) metal salt (component C).
8. The resin composition in the above paragraph 1 which comprises a light diffusing agent (component D) in an amount of 0.005 to 15.0 parts by weight based on 100 parts by weight of the component A.
9. The resin composition in the above paragraph 1, wherein the component D is a polymer fine particle.
10. The resin composition in the above paragraph 1 which comprises an ultraviolet absorbent (component E) in an amount of 0.01 to 3 parts by weight based on 100 parts by weight of the component A.
11. The resin composition in the above paragraph 1 which comprises a fluorescent brightener (component F) in an amount of 0.001 to 0.1 part by weight based on 100 parts by weight of the component A.
12. A molded article formed from the resin composition of the above paragraph 1.
13. The molded article in the above paragraph 12 which is a lighting cover having a thickness of the thickest portion of not more than 1.5 mm.

BRIEF DESCRIPTION OF THE DRAWINGS

FIG. 1 is a schematic view of a lighting cover produced in Example; and

FIG. 2 is a schematic view showing a method of measuring the degree of diffusion.

EXPLANATION OF LETTERS OR NUMERALS

A flat plate-like test specimen
B light source
γ diffusion light angle

BEST MODE FOR CARRYING OUT THE INVENTION

The present invention will be described in detail hereinunder.

<Component A: Aromatic Polycarbonate Resin>

The aromatic polycarbonate resin having a branching ratio of 0.7 to 1.1 mol % which is used as the component A of the present invention is an aromatic polycarbonate resin having a branched structure (component A-1) or a mixture of the component A-1 and a linear aromatic polycarbonate resin (component A-2). As long as the branching ratio of the entire component A is 0.7 to 1.1 mol %, an aromatic polycarbonate resin having a branched structure with a branching ratio outside the range of 0.7 to 1.1 mol % may be contained.

To provide more excellent flame retardancy, the component A contains the component A-1 in an amount of preferably 20 to 100 wt %, more preferably 70 to 100 wt %, much more preferably 100 wt %. The branching ratio of the entire component A is 0.7 to 1.1 mol %, preferably 0.7 to 1.0 mol %, more preferably 0.75 to 0.95 mol %. The branching ratio means the ratio of the number of moles of a structural unit derived from a branching agent to the total number of moles of structural units derived from dihydric phenols used in production and contained in the entire resin (number of moles of structural unit derived from branching agent/total number of moles of structural units derived from dihydric phenols× 100 (mol %)) and can be actually measured by $^1$H-NMR.

When the branching ratio is low, satisfactory branching characteristic is not obtained and melt tension becomes too low, thereby making it difficult to obtain flame retardancy, especially drip prevention property of the composition and also to carry out extrusion molding and blow molding disadvantageously. When the branching ratio is high, the polymer is crosslinked to produce a gel, thereby reducing the impact resistance of the polymer. When the branching ratio is too high, the surface of a molded article is readily clouded, whereby the cylinder temperature must be raised or the injection speed must be finely controlled to eliminate this.

When the branching ratio of the component A in the present invention is represented by Z mol % and the melt tension at 280° C. is represented by Y, the relationship between Z and Y is preferably $3.8Z-2.4 \leq Y \leq 3.8Z+4.5$, more preferably $3.8Z-1.8 \leq Y \leq 3.8Z+3.9$. When $Y<3.8Z-2.4$, dripping readily occurs in a flame retardancy test, satisfactory flame retardancy is not obtained, and further the melt tension becomes too low, thereby readily causing a drawdown and making it uneasy to carryout extrusion molding and blow molding disadvantageously. When $Y>3.8Z+4.5$, the melt tension becomes too high with the result that flowability lowers, moldability deteriorates and the surface state of a molded article becomes bad disadvantageously. The melt tension can be measured as tension which is produced at a temperature of 280° C., an extrusion rate of 10 mm/min, a pulling rate of 157 mm/s and an orifice L/D of 8/2.1.

The viscosity average molecular weight of the component A is preferably 10,000 to 50,000, more preferably 16,000 to 30,000, much more preferably 18,000 to 28,000, most preferably 19,000 to 26,000. When the molecular weight is higher than 50,000, the melt tension becomes too high, whereby moldability may deteriorate. When the molecular weight is lower than 10,000 and a molded piece is burnt, a dripping prevention effect becomes unsatisfactory, that is, the excellent flame retardancy of the present invention is hardly obtained, and the melt tension becomes too low, whereby extrusion molding and blow molding may become difficult. As the aromatic polycarbonate resin used as the component A of the present invention may be used one or more aromatic polycarbonate resins having a branched structure so that the above preferred molecular weight range is obtained. In this case, it is naturally possible to mix a polycarbonate resin having a branched structure and a viscosity average molecular weight outside the above preferred range. The viscosity average molecular weight M as used in the present invention is obtained by calculating the specific viscosity ($\eta_{sp}$) of a solution prepared by dissolving 0.7 g of the polycarbonate resin in 100 ml of methylene chloride at 20° C. with an Ostwald viscometer and inserting it into the following equation.

Specific viscosity $(\eta_{sp})=(t-t_0)/t_0$

[$t_0$ is a time (seconds) required for the dropping of methylene chloride and t is a time (seconds) required for the dropping of a sample solution]

$\eta_{sp}/c=[\eta]+0.45\times[\eta]^2 c$ ([$\eta$] represents an intrinsic viscosity)

$[\eta]=1.23\times 10^{-4} M^{0.83}$ $c=0.7$

The total amount of N (nitrogen) contained in the resin as the component A is preferably 0 to 7 ppm, more preferably 0 to 5 ppm. The total amount of N (nitrogen) contained in the resin can be measured by using the TN-10 type trace nitrogen analyzing device of Mitsubishi Chemical Co., Ltd. (chemiluminescence method).

The total amount of Cl (chlorine) is preferably 0 to 200 ppm, more preferably 0 to 150 ppm. When the total amount of N contained in the polycarbonate resin having a branched structure exceeds 7 ppm or the total amount of Cl exceeds 200 ppm, heat stability deteriorates disadvantageously.

The aromatic polycarbonate resin having a branched structure (component A-1) has a branching ratio of preferably 0.7 to 1.1 mol %, more preferably 0.7 to 1.0 mol %, much more preferably 0.75 to 0.95 mol %.

The aromatic polycarbonate resin having a branched structure (component A-1) has a viscosity average molecular weight of preferably 10,000 to 50,000, more preferably 16,000 to 30,000, much more preferably 18,000 to 28,000, most preferably 19,000 to 26,000.

The aromatic polycarbonate resin having a branched structure (component A-1) is obtained by an interfacial polymerization reaction which is carried out by using a dihydric phenol, a branching agent, a monohydric phenol and phosgene in the presence of an organic solvent.

Typical examples of the dihydric phenol used to obtain the aromatic polycarbonate resin having a branched structure (component A-1) include 2,2-bis(4-hydroxyphenyl)propane (commonly called "bisphenol A"), hydroquinone, resorcinol, 4,4'-biphenol, 1,1-bis(4-hydroxyphenyl)ethane, 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide and bis(4-hydroxyphenyl)sulfoxide. They may be used alone or in combination of two or more. Out of these, 2,2-bis(4-hydroxyphenyl)propane, that is, bisphenol A is particularly preferred.

Typical examples of a phenol having 3 or more hydroxyl groups (branching agent) used in the present invention include 1,1,1-tris(4-hydroxyphenyl)ethane, 4,6-dimethyl-2,4,6-tri(4-hydroxyphenyl)heptene-2,4,6-dimethyl-2,4,6-tri(4-hydroxyphenyl)heptane, 1,3,5-tri(4-hydroxyphenyl)benzene, 2,6-bis(2-hydroxy-5-methylbenzyl)-4-methylphenol, tetra(4-hydroxyphenyl)methane, trisphenol, bis(2,4-dihydroxyphenyl)ketone, phloroglucin, phloroglucide, isantin bisphenol, 1,4-bis(4,4-dihydroxytriphenylmethyl)benzene, trimellitic acid and pyromellitic acid. They may be used alone or in combination of two or more. Out of these, 1,1,1-tris(4-hydroxyphenyl)ethane is particularly preferred.

The monohydric phenol (terminal capping agent) used to produce the aromatic polycarbonate resin having a branched structure (component A-1) may have any structure and is not limited to a particular structure. Examples thereof include p-tert-butylphenol, p-tert-octylphenol, p-cumylphenol, 4-hydroxybenzophenone and phenol. They may be used alone or in combination of two or more. Out of these, p-tert-butylphenol is particularly preferred.

That is, preferably, the branched structure of the aromatic polycarbonate resin having a branched structure (component A-1) is derived from 1,1,1-tris(4-hydroxyphenyl)ethane, the linear structure excluding the branched structure thereof is derived from bisphenol A, and the terminal thereof has a structure derived from p-tert-butylphenol.

The branched polycarbonate resin is preferably manufactured by the following method. That is, phosgene is blown into an alkali aqueous solution containing a dihydric phenol compound and a branching agent in the presence of an organic solvent to carry out a reaction so as to obtain a polycarbonate oligomer, a monohydric phenol is injected into the polycarbonate oligomer to emulsify it, and the emulsified polycarbonate oligomer is polymerized under no agitation.

A catalyst such as a tertiary amine, a quaternary ammonium compound or a quaternary phosphonium compound exemplified by triethylamine, tributylamine, tetra-n-butylammonium bromide and tetra-n-butylphosphonium bromide may be used as a reaction catalyst for promoting the reaction. The reaction catalyst is used in an amount of preferably not more than 0.002 mol %, more preferably not more than 0.001 mol % based on the dihydric phenol compound. The above reaction is particularly preferably carried out without a catalyst. When the amount of the reaction catalyst is larger than 0.002 mol %, the melt tension becomes too high with respect to the amount of the branching agent, or a gel is produced. Further, the catalyst reacts with a chloroformate group to produce a large amount of an urethane bond which is thermally unstable, and the total content of N in the branched polycarbonate resin increases due to the remaining catalyst, thereby deteriorating impact resistance, transparency and heat resistance disadvantageously.

Therefore, the above reaction is particularly preferably carried out without a catalyst. The reaction temperature at this point is preferably 0 to 40° C., more preferably 15 to 38° C. The reaction time is about 10 minutes to about 5 hours, and pH during the reaction is kept at preferably 9.0 or more, more preferably 11.0 to 13.8.

Although means of emulsification after the monohydric phenol is injected for the above interfacial polymerization reaction is not particularly limited, agitation with a stirring device or addition of an alkali aqueous solution is employed. Examples of the stirring device include simple stirring devices such as puddle, propeller, turbine and oar type blade, high-speed stirring devices such as homogenizer, mixer and homo-mixer, static mixer, colloid mill, orifice mixer, flow jet mixer and ultrasonic emulsification device. In the method of polymerizing without a catalyst, a homo-mixer and a static mixer are preferably used.

Then, an aromatic polycarbonate resin (powder) having a branched structure can be obtained by washing, granulating and drying the organic solvent solution containing the branched aromatic polycarbonate resin. Further, the powder is melt extruded and pelletized to obtain the branched aromatic polycarbonate resin (pellet) of the present invention. Washing, granulation and drying are not particularly limited, and known methods may be employed.

To reduce the total content of Cl in the aromatic polycarbonate resin having a branched structure, a chlorinated hydrocarbon solvent such as dichloromethane(methylene chloride), dichloroethane, trichloroethane, tetrachloroethane, pentachloroethane, hexachloroethane, dichloroethylene, chlorobenzene or dichlorobenzene which is used as a solvent at the time of a reaction must be removed. For example, the polycarbonate resin powder or pellet having a branched structure is fully dried.

The aromatic polycarbonate resin having a branched structure (component A-1) preferably contains substantially no halogen atom. The expression "contains substantially no halogen atom" means that a halogen-substituted dihydric phenol is not contained in the molecule, and a trace amount of the residual solvent (halogenated hydrocarbon) and a carbonate precursor in the method of manufacturing the above aromatic polycarbonate are not targeted.

The linear aromatic polycarbonate resin as the component A-2 is obtained by reacting a dihydric phenol with a carbonate precursor by interfacial polycondensation or melt transesterification, by polymerizing a carbonate prepolymer by solid-phase transesterification or by polymerizing a cyclic carbonate compound by ring-opening polymerization.

Typical examples of the dihydric phenol used herein include hydroquinone, resorcinol, 4,4'-dihydroxydiphenyl, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (commonly known as "bisphenol A"), 2,2-bis{(4-hydroxy-3-methyl)phenyl}propane, 2,2-bis{(4-hydroxy-3,5-dimethyl)phenyl}propane, 2,2-bis{(3-isopropyl-4-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamanthane, 4,4'-dihydroxydiphenyl sulfone, 4,4'-dihydroxydiphenyl sulfoxide, 4,4'-dihydroxydiphenyl sulfide, 4,4'-dihydroxydiphenyl ketone, 4,4'-dihydroxydiphenyl ether and 4,4'-dihydroxydiphenyl ester. They may be used alone or in combination of two or more.

Out of these, a homopolymer or copolymer obtained from at least one bisphenol selected from the group consisting of bisphenol A, 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane and α,α'-bis(4-hydroxyphenyl)-m-diisopropylbenzene is preferred, and a homopolymer of bisphenol A and a copolymer of 1,1-bis(4-hydroxyphenyl)-3,3,5-trimethylcyclohexane and bisphenol A, 2,2-bis{(4-hydroxy-3-methyl)phenyl}propane or α,α'-bis(4-hydroxyphenyl)-m-diisopropylbenzene are particularly preferably used. Out of these, 2,2-bis(4-hydroxyphenyl)propane, that is, bisphenol A is most preferred.

As the carbonate precursor is used a carbonyl halide, carbonate ester or haloformate, as exemplified by phosgene, diphenyl carbonate and dihaloformates of a dihydric phenol. Out of these, phosgene or diphenyl carbonate is industrially advantageous.

To produce a polycarbonate resin by reacting the above dihydric phenol with the above carbonate precursor by interfacial polycondensation or melt transesterification, a catalyst, a terminal capping agent and an antioxidant for the dihydric phenol may be optionally used. Two or more of the obtained polycarbonate resins may be mixed together.

The interfacial polycondensation reaction is generally a reaction between a dihydric phenol and phosgene in the presence of an acid binder and an organic solvent. Examples of the acid binder include alkali metal hydroxides such as sodium hydroxide and potassium hydroxide, and amine compounds such as pyridine. Examples of the organic solvent include halogenated hydrocarbons such as methylene chloride and chlorobenzene. A catalyst such as a tertiary amine, a quaternary ammonium compound or a quaternary phosphonium compound as exemplified by triethylamine, tetra-n-butylammonium bromide and tetra-n-butylphosphonium bromide may be used to promote the reaction. The reaction temperature is generally 0 to 40° C., the reaction time is about 10 minutes to about 5 hours, and pH during the reaction is preferably kept at 9 or more. In the polymerization reaction, a terminal capping agent (monohydric phenol) is generally used. A monofunctional phenol may be used as the terminal capping agent. The monofunctional phenol is generally used as the terminal capping agent to control the molecular weight and preferably phenol or a lower alkyl-substituted phenol. A monofunctional phenol represented by the following general formula (1) is given as an example thereof.

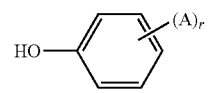
(1)

(In the above formula, A is a hydrogen atom, or a linear or branched alkyl group or phenyl group substituted alkyl group having 1 to 9 carbon atoms, and r is an integer of 1 to 5, preferably 1 to 3.)

Examples of the above monofunctional phenol include phenol, p-tert-butylphenol, p-cumylphenol and isooctylphenol. Other monofunctional phenols include phenols and benzoic acid chlorides having a long-chain alkyl group or an aliphatic polyester group as a substituent, and long-chain alkylcarboxylic acid chlorides. Out of these, phenols having a long-chain alkyl group as a substituent represented by the following general formulas (2) and (3) are preferably used.

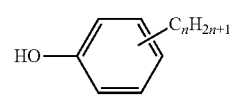
(2)

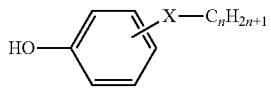

(In the above formulas, X is —R—O—, —R—CO—O— or —R—O—CO— (R is a single bond or divalent aliphatic hydrocarbon group having 1 to 10, preferably 1 to 5 carbon atoms), and n is an integer of 10 to 50.)

The substituted phenols represented by the above general formula (2) are preferably phenols of the formula (2) in which n is preferably 10 to 30, particularly preferably 10 to 26, and examples thereof include decyl phenol, dodecyl phenol, tetradecyl phenol, hexadecyl phenol, octadecyl phenol, eicosyl phenol, docosyl phenol and triacontyl phenol.

The substituted phenols of the general formula (3) are suitably compounds in which X is —R—CO—O— (R is a single bond) and preferably compounds in which n is 10 to 30, specifically 10 to 26. Examples thereof include decyl hydroxybenzoate, dodecyl hydroxybenzoate, tetradecyl hydroxybenzoate, hexadecyl hydroxybenzoate, eicosyl hydroxybenzoate, docosyl hydroxybenzoate and triacontyl hydroxybenzoate. The terminal capping agents may be used alone or in combination of two or more.

The melt transesterification reaction is generally a transesterification reaction between a dihydric phenol and a carbonate ester and carried out by mixing together the dihydric phenol and the carbonate ester under heating in the presence of an inert gas and distilling off the formed alcohol or phenol. The reaction temperature which differs according to the boiling point of the formed alcohol or phenol is generally 120 to 350° C. The inside pressure of the reaction system is reduced to about $1.33 \times 10^3$ to about 13.3 Pa in the latter stage of the reaction to facilitate the distillation-off of the formed alcohol or phenol. The reaction time is generally about 1 to 4 hours.

The above carbonate ester is an ester such as an aryl group or aralkyl group having 6 to 10 carbon atoms, or an alkyl group having 1 to 4 carbon atoms, all of which may be substituted. Examples of the carbonate ester include diphenyl carbonate, bis(chlorophenyl) carbonate, dinaphthyl carbonate, bis(diphenyl) carbonate, dimethyl carbonate, diethyl carbonate and dibutyl carbonate. Out of these, diphenyl carbonate is particularly preferred.

A polymerization catalyst may be used to accelerate the polymerization rate. Examples of the polymerization catalyst include alkali metal compounds such as sodium hydroxide, potassium hydroxide, and sodium salts and potassium salts of a dihydric phenol; alkali earth metal compounds such as calcium hydroxide, barium hydroxide and magnesium hydroxide; nitrogen-containing basic compounds such as tetramethylammonium hydroxide, tetraethylammonium hydroxide, trimethylamine and triethylamine; alkoxides of an alkali meal or an alkali earth metal, organic acid salts of an alkali metal or an alkali earth metal, zinc compounds, boron compounds, aluminum compounds, silicon compounds, germanium compounds, organic tin compounds, lead compounds, osmium compounds, antimony compounds, manganese compounds, titanium compounds and zirconium compounds, all of which are generally used for an esterification reaction and a transesterification reaction. These catalysts may be used alone or in combination of two or more. The amount of the polymerization catalyst is preferably $1 \times 10^{-8}$ to $1 \times 10^{-3}$ equivalent, more preferably $1 \times 10^{-7}$ to $5 \times 10^{-4}$ equivalent based on 1 mole of the dihydric phenol as a raw material.

In order to reduce the amount of the phenolic terminal group in the polymerization reaction, a compound such as bis(chlorophenyl)carbonate, bis(bromophenyl)carbonate, bis(nitrophenyl)carbonate, bis(phenylphenyl)carbonate, chlorophenylphenyl carbonate, bromophenylphenyl carbonate, nitrophenylphenyl carbonate, phenylphenyl carbonate, methoxycarbonylphenylphenyl carbonate or ethoxycarbonylphenylphenyl carbonate may be added in the latter stage or at the end of the polycondensation reaction. Out of these, 2-chlorophenylphenyl carbonate, 2-methoxycarbonylphenylphenyl carbonate and 2-ethoxycarbonylphenylphenyl carbonate are preferred, and 2-methoxycarbonylphenylphenyl carbonate is particularly preferably used.

Further, a deactivator is preferably used to neutralize the activity of the catalyst in the polymerization reaction. Examples of the deactivator include sulfonic acid esters such as benzenesulfonic acid, p-toluenesulfonic acid, methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate and phenyl p-toluenesulfonate; and compounds such as trifluoromethanesulfonic acid, naphthalenesulfonic acid, sulfonated polystyrene, methyl acrylate-sulfonated styrene copolymer, 2-phenyl-2-propyl dodecylbenzenesulfonate, 2-phenyl-2-butyl dodecylbenzenesulfonate, tetrabutylphosphonium octylsulfonate, tetrabutylphosphonium decylsulfonate, tetrabutylphosphonium benzenesulfonate, tetraethylphosphonium dodecylbenzenesulfonate, tetrabutylphosphonium dodecylbenzenesulfonate, tetrahexylphosphonium dodecylbenzenesulfonate, tetraoctylphosphonium dodecylbenzenesulfonate, decylammonium butyl sulfate, decylammonium decyl sulfate, dodecylammonium methyl sulfate, dodecylammonium ethyl sulfate, dodecylmethylammonium methyl sulfate, dodecyldimethylammonium tetradecyl sulfate, tetradecyldimethylammonium methyl sulfate, tetramethylammonium hexyl sulfate, decyltrimethylammonium hexadecyl sulfate, tetrabutylammonium dodecylbenzyl sulfate, tetraethylammonium dodecylbenzyl sulfate and tetramethylammonium dodecylbenzal sulfate. The deactivator is not limited to these. These compounds may be used in combination of two or more.

Phosphonium salts and ammonium salts are preferred out of these deactivators. The amount of the deactivator is preferably 0.5 to 50 moles based on 1 mole of the residual catalyst. The deactivator is used in an amount of preferably 0.01 to 500 ppm, more preferably 0.01 to 300 ppm, particularly preferably 0.01 to 100 ppm based on the polycarbonate resin after polymerization.

Although the molecular weight of the linear aromatic polycarbonate resin as the component A-2 is not particularly limited, when the viscosity average molecular weight is lower than 10,000, high-temperature properties deteriorate and when the viscosity average molecular weight is higher than 50,000, moldability degrades. Therefore, the viscosity average molecular weight of the linear aromatic polycarbonate resin is preferably 10,000 to 50,000, more preferably 16,000 to 30,000, much more preferably 18,000 to 28,000, most preferably 19,000 to 26,000. Two or more linear polycarbonate resins may be mixed together. In this case, it is possible to mix a polycarbonate resin having a viscosity average molecular weight outside the above range as long as the viscosity average molecular weight of a mixture of two or more linear polycarbonate resins falls within the above preferred range.

A mixture of a polycarbonate resin having a viscosity average molecular weight of more than 50,000 is particularly preferred because it has high dripping prevention ability and the effect of the present invention is obtained more efficiently. A mixture of a polycarbonate having a viscosity average molecular weight of not less than 80,000 is more preferred, and a mixture of a polycarbonate resin having a viscosity average molecular weight of not less than 100,000 is much more preferred. That is, a mixture having a distribution with two clear peaks when measured by GPC (gel permeation chromatography) may be preferably used.

Preferably, the linear aromatic polycarbonate which is the component A-2 in the present invention is the above aromatic polycarbonate resin and contains substantially no halogen atom. The expression "contains substantially no halogen atom" means that a halogen-substituted dihydric phenol is not contained in the molecule, and a trace amount of the residual chlorine-based solvent and the carbonate precursor in the method of manufacturing the above aromatic polycarbonate are not targeted.

<Flame Retardant>

Examples of the flame retardant used in the present invention include phosphorus-based flame retardants, organic metal salt-based flame retardants such as organic alkali (earth) metal salts, silicone-based flame retardants and phosphagen-based flame retardants. At least one flame retardant selected from the group consisting of a silicone compound having an aromatic group (component B) and an organic alkali (earth) metal salt (component C) out of these is preferred. The flame retardant is preferably a mixture of a silicone compound having an aromatic group (component B) and an alkali (earth) metal salt (component C).

The content of the flame retardant is 0.005 to 12 parts by weight, preferably 0.01 to 10 parts by weight, more preferably 0.15 to 9 parts by weight based on 100 parts by weight of the component A. When the content of the flame retardant is lower than 0.005 part by weight, satisfactory flame retardancy is not obtained and when the content is higher than 12 parts by weight, satisfactory mechanical properties are not obtained.

<Component B: Silicone Compound>

In the present invention, a silicone compound having an aromatic group is used as the component B. Preferably, the component B has a viscosity at 25° C. of 300 cSt or less. When the viscosity is high, the transparency of a molded article lowers. To enable the silicone compound as the component B to exhibit a flame retarding effect efficiently, its dispersion state in the combustion step is important. The important factor for determining the dispersion state is viscosity. This is considered to be due to the fact that when the silicone compound is too volatile in the combustion step, that is, the viscosity of the silicone compound is too low, silicone remaining in the system at the time of combustion is thin, thereby making it difficult to form a uniform silicone structure at the time of combustion. From this point of view, the viscosity at 25° C. is preferably 10 to 300 cSt, more preferably 15 to 200 cSt, most preferably 20 to 170 cSt.

Since the aromatic group of the component B is bonded to a silicone atom, enhances compatibility with the polycarbonate resin, contributes to the maintenance of transparency and is advantageous in the formation of a carbide film at the time of combustion, it contributes to the development of a flame retarding effect. When the component B does not have an aromatic group, the transparency of a molded article is hardly obtained and it may be difficult to obtain high flame retardancy.

The component B is preferably a silicone compound having an Si—H group in the molecule. It is more preferably at least one silicone compound selected from silicone compounds having an Si—H group and an aromatic group in the molecule, wherein (i) the content of the Si—H group (Si—H content) is 0.1 to 1.2 moles/100 g, (ii) the content of the aromatic group (aromatic group content) represented by the following general formula (5) is 10 to 70 wt %:

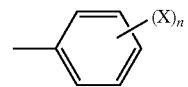

(In the formula (5), X is an OH group or hydrocarbon group having 1 to 20 carbon atoms which may have a hetero atom-containing functional group. n is an integer of 0 to 5. When n is 2 or more, X's may be different), and (iii) the average degree of polymerization is 3 to 150.

Much more preferably, the component B is at least one silicone compound selected from silicone compounds containing at least one of constituents units represented by the following general formulas (6) and (7).

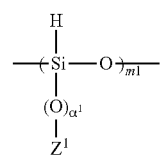

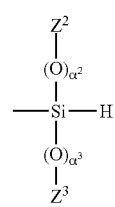

(In the formulas (6) and (7), $Z^1$ to $Z^3$ are each independently a hydrogen atom, hydrocarbon group having 1 to 20 carbon atoms which may have a hetero atom-containing functional group, or a compound represented by the following general formula (8). $\alpha 1$ to $\alpha 3$ are each independently 0 or 1. m1 is 0 or an integer of 1 or more. Further, in the formula (8), when m1 is 2 or more, the recurring units may be different.)

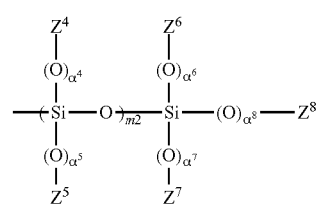

(In the formula (8), $Z^4$ to $Z^8$ are each independently a hydrogen atom or hydrocarbon group having 1 to 20 carbon atoms which may have a hetero atom-containing functional group. $\alpha 4$ to $\alpha 8$ are each independently 0 or 1. m2 is 0 or an integer of 1 or more. When m2 is 2 or more in the formula (8), the recurring units may be different.)

Most preferably, the component B is a silicone compound comprising a MD unit or a MDT unit when M represents a monofunctional siloxane unit, D represents a bifunctional siloxane unit and T represents a trifunctional siloxane unit.

Examples of the hydrocarbon group having 1 to 20 carbon atoms which may have a hetero atom-containing functional group represented by $Z^1$ to $Z^8$ in the constituent units represented by the above general formulas (6), (7) and (8) and X in the general formula (5) include alkyl groups such as methyl group, ethyl group, propyl group, butyl group, hexyl group and decyl group, cycloalkyl groups such as cyclohexyl group, alkenyl groups such as vinyl group and allyl group, aryl groups such as phenyl group and tolyl group, and aralkyl group. Further, these groups may contain a functional group such as epoxy group, carboxyl group, carboxylic anhydride group, amino group or mercapto group. An alkyl group having 1 to 8 carbon atoms, alkenyl group or aryl group is more preferred, and an alkyl group having 1 to 4 carbon atoms such as methyl group, ethyl group or propyl group, vinyl group or phenyl group is particularly preferred.

When the silicone compound containing at least one constituent unit out of the constituent units represented by the above general formulas (6) and (7) has a plurality of siloxane bond recurring units, it may be a random copolymer block copolymer or tapered copolymer.

In the present invention, the Si—H content in the silicone compound containing an Si—H group which is preferred as the component B is preferably 0.1 to 1.2 mol/100 g. When the Si—H content is 0.1 to 1.2 mol/100 g, it is easy to form the structure of silicone at the time of combustion. The Si—H content is more preferably 0.1 to 1.0 mol/100 g, most preferably 0.2 to 0.6 mol/100 g. When the Si—H content is low, it is difficult to form the structure of silicone and when the Si—H content is high, the heat stability of the composition degrades. The structure of silicone is a network structure formed by a reaction between silicone compounds or a reaction between the resin and silicone.

The Si—H content is the number of moles of a Si—H structure contained based on 100 g of the silicone compound. This can be obtained by measuring the volume of a hydrogen gas generated per unit weight of the silicone compound. For example, when 122 ml of a hydrogen gas is produced based on 1 g of the silicone compound at 25° C., the Si—H content is 0.5 mol/100 g based on the following calculation formula.

$$122 \times 273/(273+25) \div 22400 \times 100 \approx 0.5$$

Meanwhile, to suppress the white turbidity of a molded article or the reduction of transparency by a moist heat treatment of a resin composition comprising an aromatic polycarbonate resin (component A) and a silicone compound having an aromatic group (component B), as described above, the dispersion state of the silicone compound is important. When the silicone compound is eccentrically located, the resin composition itself becomes clouded and exfoliation occurs on the surface of a molded article, or the silicone compound is shifted and eccentrically located at the time of a moist heat treatment, thereby reducing transparency. Therefore, it is difficult to obtain a molded article having high transparency. The important factors that determine the dispersion state are the content of the aromatic group in the silicone compound and the average degree of polymerization. The average degree of polymerization is especially important for a transparent resin composition.

From this point of view, the silicone compound (component B) preferably has an aromatic group content of 10 to 70 wt %. The aromatic group content is more preferably 15 to 60 wt %, most preferably 25 to 55 wt %. When the aromatic group content of the silicone compound is lower than 10 wt %, the silicone compound is eccentrically located with the result that a dispersion failure occurs, thereby making it difficult to obtain a molded article having high transparency.

When the aromatic group content is higher than 70 wt %, the rigidity of the molecule of the silicone compound itself becomes high, whereby the silicone compound is eccentrically located with the result that a dispersion failure occurs as well, thereby making it difficult to obtain a molded article having high transparency.

The aromatic group content is the content of the aromatic group represented by the above general formula (5) in the silicone compound and can be obtained from the following calculation formula.

$$\text{aromatic group content} = [A/M] \times 100 \text{ (wt \%)}$$

In the above formula, A and M denote the following numerical values.
A=total molecular weight of all aromatic groups represented by the general formula (5) contained in one molecule of silicone compound
M=molecular weight of silicone compound Further, the refractive index at 25° C. of the silicone compound (component B) is preferably 1.40 to 1.60. The refractive index of the silicone compound is more preferably 1.42 to 1.59, most preferably 1.44 to 1.59. When the refractive index falls within the above range, the silicone compound is finely dispersed in the aromatic polycarbonate, whereby a resin composition which is little clouded and has excellent dye-affinity is provided.

Further, the volatilization volume measured by a 105° C./3 hour loss-on-heat method of the silicone compound (component B) is preferably not more than 18%. The volatilization volume of the silicone compound is more preferably not more than 10%. When the volatilization volume is larger than 18% and the resin composition of the present invention is extruded and pelletized, the amount of a product volatilized from the resin becomes large, and further a large number of air bubbles are apt to be formed in a molded article.

The silicone compound (component B) may have a linear or branched structure if it satisfies the above conditions, and compounds having an Si—H group at any one of a side chain, terminal or branch point, or at a plurality of sites in the molecular structure may be used.

In general, the structure of the silicone compound having an Si—H group in the molecule is constituted by combining the following four siloxane units arbitrarily.
M unit: monofunctional siloxane unit such as $(CH_3)_3SiO_{1/2}$, $H(CH_3)_2SiO_{1/2}$, $H_2(CH_3)SiO_{1/2}$, $(CH_3)_2(CH_2=CH)SiO_{1/2}$, $(CH_3)_2(C_6H_5)SiO_{1/2}$ or $(CH_3)(C_6H_5)(CH_2=CH)SiO_{1/2}$
D unit: bifunctional siloxane unit such as $(CH_3)_2SiO$, $H(CH_3)SiO$, $H_2SiO$, $H(C_6H_5)SiO$, $(CH_3)(CH_2=CH)SiO$ or $(C_6H_5)_2SiO$
T unit: trifunctional siloxane unit such as $(CH_3)SiO_{3/2}$, $(C_3H_7)SiO_{3/2}$, $HSiO_{3/2}$, $(CH_2=CH)SiO_{3/2}$ or $(C_6H_5)SiO_{3/2}$
Q unit: tetrafunctional siloxane unit represented by $SiO_2$ The structure of the silicone compound containing an Si—H group used in the present invention is represented by $D_n$, $T_p$, $M_mD_n$, $M_mT_p$, $M_mQ_q$, $M_mD_nT_p$, $M_mD_nQ_q$, $M_mT_pQ_q$, $M_mD_nT_pQ_q$, $D_nT_p$, $D_nQ_q$ or $D_nT_pQ_q$. Out of these, the structure of the silicone compound is represented by preferably $M_mD_n$, $M_mT_p$, $M_mD_nT_p$ or $M_mD_nQ_q$, more preferably $M_mD_n$ or $M_mD_nT_p$.

(The coefficients m, n, p and q in the above formulas are each an integer which indicates the degree of polymerization of each siloxane unit. When one of m, n, p and q is 2 or more, the siloxane units having this coefficient can be 2 or more of units having different bonded hydrogen atom or the hydrocarbon group having 1 to 20 carbon atoms which may have a hetero atom-containing functional group.)

The total of the above coefficients in each formula indicates the average degree of polymerization of the silicone compound. In the present invention, this average degree of polymerization is in the range of preferably 3 to 150, more preferably 4 to 80, much more preferably 5 to 60. When the average degree of polymerization is lower than 3, the volatility of the silicone compound itself becomes high, whereby the amount of volatile matter from the resin tends to become large at the time of processing the resin composition comprising this silicone compound. When the average degree of polymerization is higher than 150, the flame retardancy and transparency of the resin composition comprising this silicone compound tend to become unsatisfactory.

The above silicone compounds may be used alone or in combination of two or more.

The silicone compound having an Si—H bond can be manufactured by a method known per se. For example, an organochlorosilane corresponding to the structure of a silicone compound of interest is co-hydrolyzed, and the by-produced hydrochloric acid or low-boiling matter is removed to obtain a product of interest. When a silicone oil, cyclic siloxane or alkoxysilane having a Si—H bond, an aromatic group represented by the general formula (5) and a hydrocarbon group having 1 to 20 carbon atoms which may have a hetero atom-containing functional group in the molecule is used as a starting material, a polymerization reaction is carried out by using an acid catalyst such as hydrochloric acid, sulfuric acid or methanesulfonic acid and adding water for hydrolysis according to circumstances, and then the used acid catalyst and low-boiling matter are removed likewise to obtain a silicone compound of interest.

Further, the silicone compound containing a Si—H group has siloxnae units M, $M^H$, D, $D^H$, $D^{\Phi 2}$, T and $T^{\Phi}$ represented by the following structural formulas (M: $(CH_3)_3SiO_{1/2}$, $M^H$: $H(CH_3)_2SiO_{1/2}$, D: $(CH_3)_2SiO$, $D^H$: $H(CH_3)SiO$, $D^{\Phi 2}$: $(C_6H_5)_2Si$, T: $(CH_3)SiO_{3/2}$, $T^{\Phi}$: $(C_6H_5)SiO_{3/2}$), and when the average numbers of siloxane units in one molecule are represented by m, $m_h$, d, $d_h$, $d_{p2}$, t and $t_p$, all the following relational expressions are preferably satisfied.

$$2 \leq m + m_h \leq 40$$

$$0.35 \leq d + d_h + d_{p2} \leq 148$$

$$0 \leq t + t_p \leq 38$$

$$0.35 \leq m_h + d_h \leq 110$$

Outside the above ranges, the resin composition of the present invention hardly achieves excellent flame retardancy and excellent transparency at the same time, and it may be difficult to manufacture a silicone compound containing an Si—H group.

The content of the silicone compound (component B) is preferably 0.1 to 2 parts by weight, more preferably not less than 0.1 part by weight and less than 2 parts by weight, much more preferably 0.1 to 1.8 parts by weight, particularly preferably 0.1 to 1.5 parts by weight, most preferably 0.1 to 1 part by weight based on 100 parts by weight of the aromatic polycarbonate resin (component A). When the content of the silicone compound is too high, the heat resistance of the resin lowers, or a gas is readily produced at the time of processing and when the content is too low, flame retardancy is not obtained.

<Component C: Alkali (Earth) Metal Salt>

As the alkali (earth) metal salt used as the component C of the present invention may be used various metal salts which have been used to flame retard a polycarbonate resin. Particularly, alkali (earth) metal salts of an organic sulfonic acid, alkali (earth) metal salts of an aromatic imide, alkali (earth) metal salts of a sulfuric acid ester and alkali (earth) metal salts of a phosphoric acid partial ester may be used.

The term "alkali (earth) metal salts" is used to mean both alkali metal salts and alkali earth metal salts.

They may be used alone or in combination of two or more. The metal constituting the organic alkali (earth) metal salt is an alkali metal or an alkali earth metal, preferably an alkali metal. Examples of the alkali metal include lithium, sodium, potassium, rubidium and cesium, and examples of the alkali earth metal include beryllium, magnesium, calcium, strontium and barium. Lithium, sodium and potassium are particularly preferred.

The alkali (earth) metal salts of an organic sulfonic acid are selected from alkali (earth) metal salts of an aliphatic sulfonic acid and alkali (earth) metal salts of an aromatic sulfonic acid. Preferred examples of the alkali (earth) metal salts of an aliphatic sulfonic acid include alkylsulfonic acid alkali (earth) metal salts, sulfonic acid alkali (earth) metal salts obtained by substituting part of the alkyl group of an alkylsulfonic acid alkali (earth) metal salt by a fluorine atom, and perfluoroalkylsulfonic acid alkali (earth) metal salts. They may be used alone or in combination of two or more.

Preferred examples of the alkylsulfonic acid alkali (earth) metal salts include methanesulfonic acid salts, ethanesulfonic acid salts, propanesulfonic acid salts, butanesulfonic acid salts, methylbutanesulfonic acid salts, hexanesulfonic acid salts, heptanesulfonic acid salts and octanesulfonic acid salts. They may be used alone or in combination of two or more. Metal salts obtained by substituting part of the alkyl group by a fluorine atom may also be used.

Preferred examples of the perfluoroalkylsulfonic acid alkali (earth) metal salts include perfluoromethanesulfonic acid salts, perfluoroethanesulfonic acid salts, perfluoropropanesulfonic acid salts, perfluorobutanesulfonic acid salts, perfluoromethylbutanesulfonic acid salts perfluorohexanesulfonic acid salts, perfluoroheptanesulfonic acid salts and perfluorooctanesulfonic acid salts. Perfluoroalkylsulfonic acid alkali (earth) metal salts having 1 to 8 carbon atoms are particularly preferred. They may be used alone or in combination of two or more.

Out of these, perfluoroalkylsulfonic acid alkali metal salts are most preferred. Out of the above alkali metals, rubidium and cesium are preferred when high flame retardancy is desired. However, since they are not versatile and are hardly purified, they may become disadvantageous from the economical point of view. Lithium and sodium are advantageous from the economic point of view but may be disadvantageous from the viewpoint of flame retardancy. In consideration of these, an alkali metal contained in the perfluoroalkylsulfonic acid alkali metal salt can be selected. However, a perfluoroalkylsulfonic acid potassium salt is most preferred because it is excellent in balance among properties. A combination of this potassium salt and a perfluoroalkylsulfonic acid alkali metal salt comprising another alkali metal may also be used.

Examples of the perfluoroalkylsulfonic acid alkali metal salt include potassium trifluoromethanesulfonate, potassium perfluorobutanesulfonate, potassium perfluorohexanesulfonate, potassium perfluorooctanesulfonate, sodium pentafluoroethanesulfonate, sodium perfluorobutanesulfonate, sodium perfluorooctanesulfonate, lithium trifluoromethanesulfonate, lithium perfluorobutanesulfonate, lithium perfluoroheptanesulfonate, cesium trifluoromethanesulfonate, cesium perfluorobutanesulfonate, cesium perfluorooctanesulfonate, cesium perfluorohexanesulfonate, rubidium perfluorobutanesulfonate and rubidium perfluorohexanesulfonate. They may be used alone or in combination of two or more. Out of these, potassium perfluorobutanesulfonate is particularly preferred.

The aromatic sulfonic acid used in the alkali (earth) metal salts of an aromatic sulfonic acid is at least one acid selected from the group consisting of a sulfonic acid of a monomer-like or polymer-like aromatic sulfide, sulfonic acid of an aromatic carboxylic acid and an ester, sulfonic acid of a monomer-like or polymer-like aromatic ether, sulfonic acid of an aromatic sulfonate, monomer-like or polymer-like aromatic sulfonic acid, monomer-like or polymer-like aromatic sulfonesulfonic acid, sulfonic acid of an aromatic ketone, heterocyclic sulfonic acid, sulfonic acid of an aromatic sulfoxide and condensate formed by the methylene type bond of an aromatic sulfonic acid. They may be used alone or in combination of two or more.

The sulfonic acid alkali (earth) metal salts of a monomer-like or polymer-like aromatic sulfide are described in JP-A 50-98539 and include disodium diphenylsulfide-4,4'-disulfonate and dipotassium diphenylsulfide-4,4'-disulfonate.

The sulfonic acid alkali (earth) metal salts of an aromatic carboxylic acid and an ester are described in JP-A 50-98540 and include potassium 5-sulfoisophthalate, sodium 5-sulfoisophthalate and polysodium polyethylene terephthalate polysulfonate.

The sulfonic acid alkali (earth) metal salts of a monomer-like or polymer-like aromatic ether are described in JP-A 50-98542 and include calcium 1-methoxynaphthalene-4-sulfonate, disodium 4-dodecylphenyl ether disulfonate, polysodium poly(2,6-dimethylphenylene oxide)polysulfonate, polysodium poly(1,3-phenylene oxide)polysulfonate, polysodium poly(1,4-phenylene oxide)polysulfonate, polypotassium poly(2,6-diphenylphenylene oxide)polysulfonate and lithium poly(2-fluoro-6-butylphenylene oxide)polysulfonate.

The sulfonic acid alkali (earth) metal salts of an aromatic sulfonate are described in JP-A 50-98544 and include potassium sulfonates of benzenesulfonate.

The monomer-like or polymer-like aromatic sulfonic acid alkali (earth) metal salts are described in JP-A 50-98546 and include sodium benzenesulfonate, strontium benzenesulfonate, magnesium benzenesulfonate, dipotassium p-benzenedisulfonate, dipotassium naphthalene-2,6-disulfonate and calcium biphenyl-3,3'-disulfonate.

The monomer-like or polymer-like aromatic sulfonesulfonic acid alkali (earth) metal salts are described in JP-A 52-54746 and include sodium diphenylsulfone-3-sulfonate, potassium diphenylsulfone-3-sulfonate, dipotassium diphenylsulfone-3,3'-disulfonate and dipotassium diphenylsulfone-3,4'-disulfonate.

The sulfonic acid alkali (earth) metal salts of an aromatic ketone are described in JP-A 50-98547 and include sodium α,α,α-trifluoroacetophenone-4-sulfonate and dipotassium benzophenone-3,3'-disulfonate.

The heterocyclic sulfonic acid alkali (earth) metal salts are described in JP-A 50-116542 and include disodium thiophene-2,5-disulfonate, dipotassium thiophene-2,5-disulfonate, calcium thiophene-2,5-disulfonate and sodium benzothiophenesulfonate.

The sulfonic acid alkali (earth) metal salts of an aromatic sulfoxide are described in JP-A 52-54745 and include potassium diphenylsulfoxide-4-sulfonate.

Examples of the condensate formed by the methylene type bond of an aromatic sulfonic acid alkali (earth) metal salt include formalin condensates of sodium naphthalenesulfonate and formalin condensates of sodium anthracenesulfonate.

The alkali (earth) metal salts of a sulfuric acid ester include alkali (earth) metal salts of a sulfuric acid ester of a monohydric and/or polyhydric alcohol, and examples of the sulfuric acid ester of a monohydric and/or polyhydric alcohol include methyl sulfuric acid esters, ethyl sulfuric acid esters, lauryl sulfuric acid esters, hexadecyl sulfuric acid esters, sulfuric acid esters of a polyoxyethylene alkylphenyl ether, mono-, di-, tri- and tetra-sulfuric acid esters of pentaerythritol, sulfuric acid esters of monoglyceridelaurate, sulfuric acid esters of monoglyceride palmitate and sulfuric acid esters of monoglyceride stearate. Out of the alkali (earth) metal salts of these sulfuric acid esters, alkali (earth) metal salts of lauryl sulfuric acid esters are preferred.

The above alkali (earth) metal salts of a phosphoric acid partial ester include alkali (earth) metal salts of bis(2,6-dibromo-4-cumylphenyl)phosphoric acid, bis(4-cumylphenyl) phosphoric acid, bis(2,4,6-tribromophenyl)phosphoric acid, bis(2,4-dibromophenyl)phosphoric acid, bis(4-bromophenyl)phosphoric acid, diphenylphosphoric acid and bis(4-tert-butylphenyl)phosphoric acid.

The above alkali (earth) metal salts of an aromatic imide include alkali (earth) metal salts of saccharin, N-(p-tolylsulfonyl)-p-toluenesulfonamide (in other words, di(p-toluenesulfone)imide), N-(N'-benzylaminocarbonyl)sulfanilimide, N-(phenylcarboxyl)sulfanilimide and bis(diphenylphosphoric acid)imide.

The preferred component out of these is at least one compound selected from the group consisting of alkali (earth) metal salts of a perfluoroalkylsulfonic acid, alkali (earth) metal salts of an aromatic sulfonic acid and alkali (earth) metal salts of an aromatic imide. At least one compound selected from the group consisting of potassium perfluorobutanesulfonate, sodium perfluorobutanesulfonate, sulfonic acid salts of diphenylsulfone represented by the formula (4), potassium salts of di(p-toluenesulfone)imide and sodium salts of di(p-toluenesulfone)imide is more preferred. Potassium perfluorobutanesulfonate is most preferred.

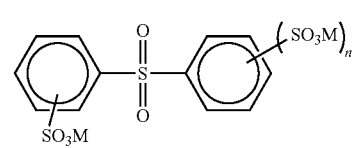

(4)

[In the above formula, n is 0 to 3, and M is K or Na.]

The content of the component C in the resin composition of the present invention is preferably 0.005 to 1.0 part by weight, more preferably 0.006 to 0.3 part by weight, much more preferably 0.007 to 0.1 part by weight, particularly preferably 0.008 to 0.05 part by weight, most preferably 0.01 to 0.025 part by weight based on 100 parts by weight of the aromatic polycarbonate resin (component A). When the content of the component C is too high, transparency which is the feature of the present invention is impaired, and flame retardancy may lower due to the decomposition of the resin at the time of molding. When the content is too low, flame retardancy becomes unsatisfactory, whereby flame retardancy which is the object of the present invention is not obtained.

The component C is preferably at least one selected from the group consisting of an alkali (earth) metal salt of a perfluoroalkylsulfonic acid, alkali (earth) metal salt of an aromatic sulfonic acid and an alkali (earth) metal salt of an aromatic imide.

<Component D: Light Diffusing Agent>

The light diffusing agent which is used as the component D in the present invention is either an organic fine particle typified by a polymer fine particle or an inorganic fine particle. Typical examples of the polymer fine particle include organic crosslinked particles obtained by polymerizing a non-crosslinkable monomer and a crosslinkable monomer. Another copolymerizable monomer except for the above monomers may also be used. Other organic crosslinked particles include silicone crosslinked particles typified by polyorganosilsesquioxane.

A polymer fine particle is preferred as the component D, and an organic crosslinked particle is particularly preferably used. Examples of the monomer used as the non-crosslinkable monomer in the organic crosslinked particle include non-crosslinkable vinyl-based monomers such as acrylic monomer, styrene-based monomer and acrylonitrile-based monomer, and olefin-based monomers. Methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate and phenyl methacrylate may be used alone or in combination as the acrylic monomer. Out of these, methyl methacrylate is particularly preferred. Styrene, alkyl styrenes such as α-methyl styrene, methyl styrene (vinyl toluene) and ethyl styrene, and halogenated styrenes such as brominated styrene may be used as the styrene-based monomer. Out of these, styrene is particularly preferred. Acrylonitrile and methacrylonitrile may be used as the acrylonitrile-based monomer. Ethylene and norbornene compounds may be used as the olefin-based monomers. Further, examples of the copolymerizable monomer include glycidyl methacrylate, N-methylmaleimide and maleic anhydride. The organic crosslinked particle of the present invention may have a unit such as N-methyl glutarimide. Examples of the crosslinkable monomer to be used with the non-crosslinkable vinyl-based monomer include divinyl benzene, allyl methacrylate, triallyl cyanurate, triallyl isocyanate, ethylene glycol di(meth)acrylate, diethylene glycol di(meth)acrylate, propylene glycol(meth)acrylate, 1,6-hexanediol di(meth)acrylate, trimethylolpropane(meth)acrylate, pentaerythritol tetra(meth)acrylate, bisphenol A di(meth)acrylate, dicyclopentanyl di(meth)acrylate, dicyclopentenyl di(meth)acrylate and N-methylol(meth)acrylamide.

The light diffusing agent used as the component D of the present invention has an average particle diameter of preferably 0.01 to 50 μm, more preferably 1 to 30 μm, much more preferably 2 to 30 μm. When the average particle diameter is smaller than 0.01 μm or larger than 50 μm, light diffusability may become unsatisfactory. The average particle diameter indicates a 50% value (D50) of an integral particle size distribution obtained by a laser diffraction/scattering method. The number of particle size distributions may be single or plural. That is, it is possible to combine two or more light diffusing agents which differ in average particle diameter. However, a more preferred light diffusing agent has a narrow particle size distribution. A diffusing agent having a distribution in which not less than 70 wt % of all particles are included in the range of 2 μm less or more of the vicinity of an average particle diameter is preferred. The shape of the light diffusing agent is preferably almost globular from the viewpoint of light diffusability and more preferred as it is closer to a spherical shape. The globular shape include an elliptical shape.

The refractive index of the light diffusing agent (component D) is preferably 1.30 to 1.80, more preferably 1.33 to 1.70, much more preferably 1.35 to 1.65. When it is contained in the resin composition, it exhibits a satisfactory light diffusing function.

The content of the component D in the present invention is preferably 0.005 to 15.0 parts by weight, more preferably 0.05 to 10.0 parts by weight, much more preferably 0.05 to 3.0 parts by weight based on 100 parts by weight of the aromatic polycarbonate resin (component A). When the content of the component D is lower than 0.005 part by weight, light diffusability becomes unsatisfactory and when the content is higher than 15.0 parts by weight, light transmittance lowers.

<Component E: Ultraviolet Absorbent>

The component E in the present invention is an ultraviolet absorbent which is added to provide light resistance. Examples of the ultraviolet absorbent include benzophenone-based ultraviolet absorbents such as 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydrate benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n-dodecyloxybenzophonone and 2-hydroxy-4-methoxy-2'-carboxybenzophenone.

Benzotriazole-based ultraviolet absorbents include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one), 2-[2-hydroxy-3-(3,4,5,6-tetrahydrophthalimidemethyl)-5-methylphenyl]benzotriazole, and polymers having a 2-hydroxyphenyl-2H-benzotriazole skeleton such as a copolymer of 2-(2'-hydroxy-5-methacryloxyethylphenyl)-2H-benzotriazole and a vinyl-based monomer copolymerizable with this monomer and a copolymer of 2-(2'-hydroxy-5-acryloxyethylphenyl)-2H-benzotriazole and a vinyl-based monomer copolymerizable with this monomer.

Hydroxyphenyltriazine-based ultraviolet absorbents include 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol and 2-(4,6-diphenyl-1,3,5-triazin-2-yl)-5-butyloxyphenol. Further, compounds having a 2,4-dimethylphenyl group as the phenyl group of the above compounds such as 2-(4,6-bis(2,4-dimethylphenyl)-1,3,5-triazin-2-yl)-5-hexyloxyphenol may also be used.

Cyclic iminoester-based ultraviolet absorbents include 2,2'-p-phenylenebis(3,1-benzoxazin-4-one), 2,2'-m-phenylenebis(3,1-benzoxazin-4-one) and 2,2'-p,p'-diphenylenebis(3,1-benzoxazin-4-one).

Cyanoacrylate-based ultraviolet absorbents include 1,3-bis-[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

When the ultraviolet absorbent (component E) has the structure of a monomer compound which can be radically polymerized, it may be a polymer type ultraviolet absorbent obtained by copolymerizing the ultraviolet absorbing monomer and/or optically stable monomer with a monomer such as an alkyl(meth)acrylate. Preferred examples of the above ultraviolet absorbing monomer include compounds containing a benzotriazole skeleton, benzophenone skeleton, triazine skeleton, cyclic iminoester skeleton or cyanoacrylate skeleton in the ester substituent of a (meth)acrylic acid ester.

Out of them, benzotriazole-based and hydroxyphenyltriazine-based ultraviolet absorbents are preferred from the viewpoint of ultraviolet absorptivity, and cyclic iminoester-based and cyanoacrylate-based ultraviolet absorbents are preferred from the viewpoints of heat resistance and color. The above ultraviolet absorbents may be used alone or in combination of two or more.

The content of the ultraviolet absorbent (component E) is preferably 0.01 to 3 parts by weight, more preferably 0.02 to 2 parts by weight, much more preferably 0.03 to 1 part by weight, most preferably 0.05 to 0.5 part by weight based on 100 parts by weight of the component A.

<Component F: Fluorescent Brightener>

The fluorescent brightener as the component F in the present invention is not particularly limited if it is used to change the color of a resin to a white or blue-white color. Examples thereof include stilbene-based, benzimidazole-based, benzoxazole-based, naphthalimide-based, rhodamine-based, coumarin-based and oxazine-based compounds. CI Fluorescent Brightener 219:1 and EASTOBRITE OB-1 of Eastman Chemical Co., Ltd. are such examples. The fluorescent brightener absorbs the energy of an ultraviolet part of light and applies this energy to a visible part. The content of the fluorescent brightener (component F) is preferably 0.001 to 0.1 part by weight, more preferably 0.001 to 0.05 part by weight based on 100 parts by weight of the component A. Even when the content is higher than 0.1 part by weight, the effect of improving the color of the composition is small.

<Other Components>

Although the resin composition of the present invention may comprise another resin and a filler as long as its transparency is not impaired, as most of the other resins and fillers impair transparency, the types and amounts thereof must be selected in consideration of this.

(Another Thermoplastic Resin)

The resin composition of the present invention may comprise another thermoplastic resin except for the component A in order to improve the mechanical properties, chemical properties or electrical properties of a molded article as long as its transparency is not impaired. The content of this thermoplastic resin which changes according to type and purpose is preferably 1 to 30 parts by weight, more preferably 2 to 20 parts by weight based on 100 parts by weight of the aromatic polycarbonate resin (component A).

Examples of the thermoplastic resin include general-purpose plastics typified by polyethylene resin, polypropylene resin and polyalkyl methacrylate resin, engineering plastics typified by polyphenylene ether resin, polyacetal resin, polyamide resin, cyclic polyolefin resin and polyarylate resin (amorphous polyarylate, liquid crystalline polyarylate), and so-called "super-engineering plastics" such as polyether ether ketone, polyether imide, polysulfone, polyether sulfone and polyphenylene sulfide. Further, thermoplastic elastomers such as olefin-based thermoplastic elastomers, polyamide-based thermoplastic elastomers and polyurethane-based thermoplastic elastomers may also be used.

The resin composition of the present invention may comprise small amounts of additives known per se in order to provide various functions to and improve the characteristic properties of a molded article. These additives are used in usual amounts as long as the object of the present invention is not impaired.

The additives include a drip inhibitor (such as a fluorine-containing polymer having fibril formability), heat stabilizer, ultraviolet absorbent, optical stabilizer, release agent, lubricant, sliding agent (such as PTFE particles), colorant (pigment or dye such as carbon black or titanium oxide), fluorescent brightener, light storage pigment, fluorescent dye, antistatic agent, flowability modifier, crystal nucleating agent, inorganic and organic antibacterial agent, optical catalyst-based anti-fouling agent (such as particulate titanium oxide or particulate zinc oxide), impact modifier typified by graft rubber, infrared absorbent and photochromic agent.

Additives which are used to improve an aromatic polycarbonate resin are advantageously used to improve the heat stability, antioxidant property, optical stability (ultraviolet stability) and releasability of the resin composition of the present invention. A detailed description is subsequently given of these additives.

(Phosphorus-Containing Stabilizer)

The resin composition of the present invention may comprise a phosphorus-containing stabilizer as a heat stabilizer. As the phosphorus-containing stabilizer may be used a phosphite compound, a phosphonite compound and a phosphate compound.

Various phosphite compounds may be used. More specifically, a phosphite compound represented by the following general formula (9), a phosphite compound represented by the following general formula (10) and a phosphite compound represented by the following general formula (11) may be used.

(9)

[In the above formula, $R^8$ is a hydrogen atom, alkyl group having 1 to 20 carbon atoms, aryl group or alkylaryl group having 6 to 20 carbon atoms, aralkyl group having 7 to 30 carbon atoms, or halo, alkylthio(alkyl group having 1 to 30 carbon atoms) or hydroxyl substituent thereof, and three $R^8$'s may be the same or different, or a cyclic structure when they are derived from a dihydric phenol.]

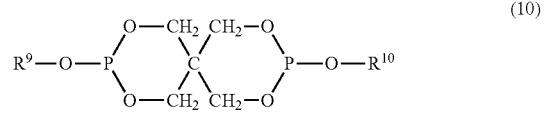

(10)

[In the above formula, $R^9$ and $R^{10}$ are each a hydrogen atom, alkyl group having 1 to 20 carbon atoms, aryl group or alkylaryl group having 6 to 20 carbon atoms, aralkyl group having 7 to 30 carbon atoms, cycloalkyl group having 4 to 20 carbon atoms, or 2-(4-oxyphenyl)propyl-substituted aryl group having 15 to 25 carbon atoms. The cycloalkyl group and the aryl group may or may not be substituted by an alkyl group.]

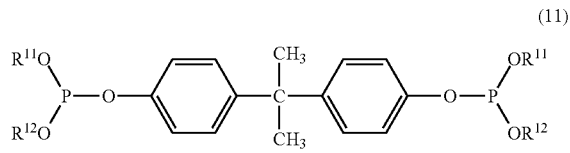

(11)

[In the above formula, $R^{11}$ and $R^{12}$ are each an alkyl group having 12 to 15 carbon atoms. $R^{11}$ and $R^{12}$ may be the same or different.]

A phosphonite compound represented by the following general formula (12) and a phosphonite compound represented by the following general formula (13) may be used.

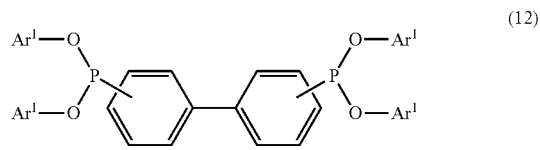

(12)

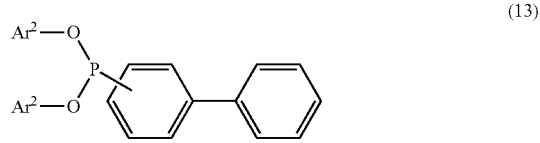

(13)

[In the above formulas, $Ar^1$ and $Ar^2$ are each an aryl group or alkylaryl group having 6 to 20 carbon atoms, or 2-(4-oxyphenyl)propyl-substituted aryl group having 15 to 25 carbon atoms. Four $Ar^1$'s may be the same or different and two $Ar^2$'s may be the same or different.]

Preferred examples of the phosphite compound represented by the above general formula (9) include diphenylisooctyl phosphite, 2,2'-methylenebis(4,6-di-tert-butylphenyl)octyl phosphite, diphenyl mono(tridecyl)phosphite, phenyl diisodecyl phosphite and phenyl di(tridecyl)phosphite.

Preferred examples of the phosphite compound represented by the above general formula (10) include distearyl pentaerythritol diphosphite, bis(2,4-di-tert-butylphenyl)pentaerythritol diphosphite, bis(2,6-di-tert-butyl-4-methylphenyl)pentaerythritol diphosphite, phenyl bisphenol A pentaerythritol diphosphite and dicyclohexyl pentaerythritol diphosphite, out of which distearyl pentaerythritol diphosphite, bis(2,4-di-tert-butylphenyl)pentaerythritol diphosphite and bis(2,6-di-tert-butyl-4-methylphenyl)pentaerythritol diphosphite are preferred. These phosphite compounds may be used alone or in combination of two or more.

Preferred examples of the phosphite compound represented by the above general formula (11) include 4,4'-isopropylidenediphenol tetramidecyl phosphite.

Preferred examples of the phosphonite compound represented by the above general formula (12) include tetrakis(2,4-di-iso-propylphenyl)-4,4'-biphenylene diphosphonite, tetrakis(2,4-di-n-butylphenyl)-4,4'-biphenylene diphosphonite, tetrakis(2,4-di-tert-butylphenyl)-4,4'-biphenylene diphosphonite, tetrakis(2,4-di-tert-butylphenyl)-4,3-r-biphenylene diphosphonite, tetrakis(2,4-di-tert-butylphenyl)-3,3'-biphenylene diphosphonite, tetrakis(2,6-di-iso-propylphenyl)-4,4'-biphenylene diphosphonite, tetrakis(2,6-di-n-butylphenyl)-4,4'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite and tetrakis(2,6-di-tert-butylphenyl)-3,3'-biphenylene diphosphonite, out of which tetrakis(di-tert-butylphenyl)-biphenylene diphosphonites are preferred, and tetrakis(2,4-di-tert-butylphenyl)-biphenylene diphosphonites are more preferred. A mixture of two or more of these tetrakis(2,4-di-tert-butylphenyl)-biphenylene diphosphonites is preferred. For example, tetrakis(2,4-di-tert-butylphenyl)-4,4'-biphenylene diphosphonite (component E2-1), tetrakis(2,4-di-tert-butylphenyl)-4,3'-biphenylene diphosphonite (component E2-2) and tetrakis(2,4-di-tert-butylphenyl)-3,3'-biphenylene diphosphonite (component E2-3) may be used alone or in combination of two or more, and a mixture of these three is preferred. In the case of a mixture of the above three components, the mixing weight ratio of the components E2-1, E2-2 and E2-3 is 100:37 to 64:4 to 14, more preferably 100:40 to 60:5 to 11.

Preferred examples of the phosphonite compound represented by the above general formula (13) include bis(2,4-di-iso-propylphenyl)-4-phenyl-phenylphosphonite, bis(2,4-di-n-butylphenyl)-3-phenyl-phenyl phosphonite, bis(2,4-di-tert-butylphenyl)-4-phenyl-phenylphosphonite, bis(2,4-di-tert-butylphenyl)-3-phenyl-phenylphosphonite, bis(2,6-di-iso-propylphenyl)-4-phenyl-phenylphosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite, out of which bis(di-tert-butylphenyl)-phenyl-phenyl phosphonites are preferred and bis(2,4-di-tert-butylphenyl)-phenyl-phenyl phosphonites are more preferred. A mixture of two or more bis(2,4-di-tert-butylphenyl)-phenyl-phenyl phosphonites is preferred. More specifically, bis(2,4-di-tert-butylphenyl)-4-phenyl-phenyl phosphonite and bis(2,4-di-tert-butylphenyl)-3-phenyl-phenyl phosphonite may be used alone or in combination, and a mixture of these two is preferred. In the case of a mixture of these two, the mixing weight ratio of these two is preferably 5:1 to 4, more preferably 5:2 to 3.

Examples of the phosphate compound include tributyl phosphate, trimethyl phosphate, tricresyl phosphate, triphenyl phosphate, trichlorophenyl phosphate, triethyl phosphate, diphenylcresyl phosphate, diphenyl monoorthoxenyl phosphate, tributoxyethyl phosphate, dibutyl phosphate, dioctyl phosphate and diisopropyl phosphate. Out of these, trimethyl phosphate is preferred.

Out of the above phosphorus-containing heat stabilizers, compounds represented by the following general formulas (14) and (15) are more preferred.

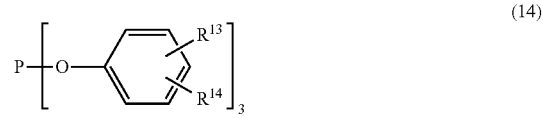

(14)

(In the above formula (14), $R^{13}$ and $R^{14}$ are each independently an alkyl group having 1 to 12 carbon atoms, cycloalkyl group, aryl group or aralkyl group.)

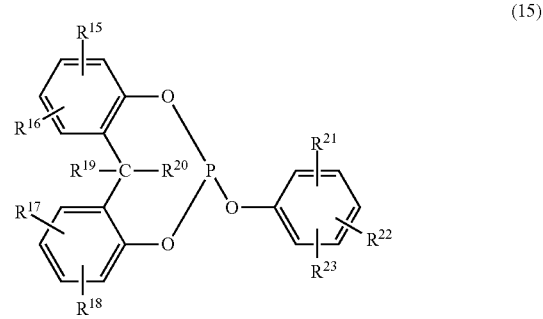

(15)

(In the above formula (15), $R^{15}$, $R^{16}$, $R^{17}$, $R^{18}$, $R^{21}$, $R^{22}$ and $R^{23}$ are each independently a hydrogen atom, or an alkyl group having 1 to 12 carbon atoms, cycloalkyl group, aryl group or aralkyl group, $R^{19}$ is a hydrogen atom or alkyl group having 1 to 4 carbon atoms, and $R^{20}$ is a hydrogen atom or methyl group.)

In the formula (14), $R^{13}$ and $R^{14}$ are each preferably an alkyl group having 1 to 12 carbon atoms, more preferably an alkyl group having 1 to 8 carbon atoms. Examples of the compound represented by the formula (14) include tris(dimethylphenyl)phosphite, tris(diethylphenyl)phosphite, tris(di-iso-propylphenyl)phosphite, tris(di-n-butylphenyl)phosphite, tris(2,4-di-tert-butylphenyl)phosphite and tris(2,6-di-tert-butylphenyl)phosphite, out of which tris(2,6-di-tert-butylphenyl)phosphite is particularly preferred.

Examples of the compound represented by the formula (15) include phosphites derived from 2,2'-methylenebis(4,6-di-tert-butylphenol) and 2,6-di-tert-butylphenol, and phosphites derived from 2,2'-methylenebis(4,6-di-tert-butylphenol) and phenol, out of which phosphites derived from 2,2'-methylenebis(4,6-di-tert-butylphenol) and phenol are particularly preferred.

The phosphorus compound represented by the formula (15) can be produced by a known method. For example, a corresponding phosphate chloride is obtained by reacting a bisphenol compound represented by the following general formula (16) with phosphorus trichloride and then reacted with a phenol represented by the following general formula (17).

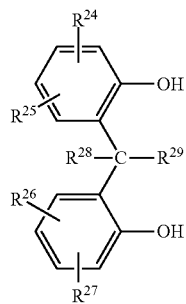

(16)

(In the formula (16), $R^{24}$, $R^{25}$, $R^{26}$ and $R^{27}$ are each independently a hydrogen atom, or an alkyl group having 1 to 12 carbon atoms, cycloalkyl group, aryl group or aralkyl group, $R^{28}$ is a hydrogen atom or alkyl group having 1 to 4 carbon atoms, and $R^{29}$ is a hydrogen atom or methyl group.)

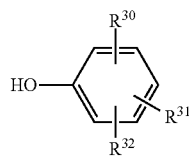

(17)

(In the formula (17), $R^{30}$, $R^{31}$ and $R^{32}$ are each a hydrogen atom, or an alkyl group having 1 to 12 carbon atoms, cycloalkyl group, aryl group or aralkyl group.)

Examples of the compound represented by the above general formula (16) include 2,2'-methylenebisphenol, 2,2'-methylenebis(4-methylphenol), 2,2'-methylenebis(6-methylphenol), 2,2'-methylenebis(4,6-dimethylphenol), 2,2'-ethylidenebisphenol, 2,2'-ethylidenebis(4-methylphenol), 2,2'-isopropylidenebisphenol, 2,2'-methylenebis(4-methyl-6-tert-butylphenol), 2,2'-methylenebis(4-ethyl-6-tert-butylphenol), 2,2'-methylenebis(4,6-di-tert-butylphenol), 2,2'-methylenebis(4-methyl-6-cyclohexylphenol), 2,2'-dihydroxy-3,3'-di(α-methylcyclohexyl)-5,5'-dimethyl phenylmethane, 2,2'-methylenebis(6-α-methyl-benzyl-p-cresol), 2,2'-ethylidene-bis(4,6-di-tert-butylphenol) and 2,2-butylidene-bis(4-methyl-6-tert-butylphenol), out of which 2,2'-methylenebis(4-methyl-6-tert-butylphenol), 2,2'-methylenebis(4-ethyl-6-tert-butylphenol), 2,2'-methylenebis(4,6-di-tert-butylphenol), 2,2'-ethylidene-bis(4,6-di-tert-butylphenol) and 2,2'-butylidene-bis(4-methyl-6-tert-butylphenol) are preferred.

Examples of the compound represented by the general formula (17) include phenol, 2-methylphenol, 3-methylphenol, 4-methylphenol, 2,4-dimethylphenol, 2,6-dimethylphenol, 2-tert-butyl-4-methylphenol, 2,4-di-tert-butylphenol, 2,6-di-tert-butylphenol, 2,6-di-tert-butyl-4-methylphenol, 2,4-dimethyl-6-tert-butylphenol, 2,6-di-tert-butyl-4-ethylphenol, 2,4,6-tri-tert-butylphenol and 2,6-di-tert-butyl-4-s-butylphenol. Compounds having two or more alkyl substituents are preferred.

(Antioxidant)

As the antioxidant which can be contained in the resin composition of the present invention may be used a phenol-based antioxidant. The phenol-based antioxidant can suppress discoloration at the time of exposure to heat and produces an effect of improving flame retardancy to some extent. Various phenol-based antioxidants may be used.

Preferred examples thereof include vitamin E, n-octadecyl-β-(4'-hydroxy-3',5'-di-tert-butylphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidene-bis(3-methyl-6-tert-butylphenol), triethylene glycol-N-bis-3-(3-tert-butyl-4-hydroxy-5-methylphenyl)propionate, 1,6-hexanediol-bis[3-(3,5-di-tert-butyl-4-hydroxyphenyl) propionate], bis[2-tert-butyl-4-methyl-6-(3-tert-butyl-5-methyl-2-hydroxybenzyl)phenyl]terephthalate, 3,9-bis{2-[3-(3-tert-butyl-4-hydroxy-5-methylphenyl) propionyloxy]-1,1-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,4-bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tris(3,5-di-tert-butyl-4-hydroxyphenyl)isocyanurate, tris(3,5-di-tert-butyl-4-hydroxybenzyl)isocyanurate, 1,3,5-tris(4-tert-butyl-3-hydroxy-2,6-dimethylbenzyl) isocyanurate, 1,3,5-tris-2[3 (3,5-di-tert-butyl-4-hydroxyphenyl) propionyloxy]ethyl isocyanurate and tetrakis[methylene-3-(3',5'-di-tert-butyl-4-hydroxyphenyl)propionate]methane.

n-octadecyl-β-(4'-hydroxy-3',5'-di-tert-butylphenyl)propionate, 2-tert-butyl-6-(3'-tert-butyl-5'-methyl-2'-hydroxybenzyl)-4-methylphenyl acrylate, 3,9-bis{2-[3-(3-tert-butyl-4-hydroxy-5-methylphenyl) propionyloxy]-1,1-dimethylethyl}-2,4,8,10-tetraoxaspiro[5,5]undecane and tetrakis[methylene-3-(3',5'-di-tert-butyl-4-hydroxyphenyl) propionate]methane are more preferred, and n-octadecyl-β-(4'-hydroxy-3',5'-di-tert-butylphenyl)prop ionate is much more preferred.

A sulfur-containing antioxidant may also be used as the antioxidant. It is advantageous particularly when the resin composition is used in rotational molding or compression molding. Examples of the sulfur-containing antioxidant include dilauryl-3,3'-thiodipropionic acid ester, ditridecyl-3,3'-thiodipropionic acid ester, dimyristyl-3,3'-thiodipropionic acid ester, distearyl-3,3'-thiodipropionic acid ester, lauryl stearyl-3,3'-thiodipropionic acid ester, pentaerythritol tetra(β-laurylthiopropionate)ester, bis[2-methyl-4-(3-laurylthiopropionyloxy)-5-tert-butylphenyl]sulfide, octadecyl disulfide, mercapto-benzimidazole, 2-mercapto-6-methylbenzimidazole and 1,1'-thiobis(2-naphthol). Out of these, pentaerythritol tetra(β-laurylthiopropionate)ester is preferred.

The above phosphorus-containing heat stabilizers, phenol-based antioxidants and sulfur-containing antioxidants may be used alone or in combination of two or more. Phosphorus-containing stabilizers are more preferred, and phosphorus-containing heat stabilizers containing a compound of the above general formula (14) are particularly preferred.

As for the content of the stabilizer in the composition, the content of the phosphorus-containing stabilizer, phenol-based antioxidant or sulfur-containing antioxidant is preferably 0.0001 to 1 part by weight, more preferably 0.0005 to 0.5 part by weight, much more preferably 0.001 to 0.2 part by weight based on 100 parts by weight of the aromatic polycarbonate resin (component A).

(Release Agent)

The resin composition of the present invention may comprise a release agent as required. In the present invention, when the resin composition comprises the component B, it has flame retardancy. Therefore, even when the resin composition of the present invention comprises a release agent which has a bad influence upon flame retardancy, it can obtain high flame retardancy. A release agent known per se may be used. Examples of the release agent include saturated fatty acid esters, unsaturated fatty acid esters, polyolefin-based waxes (such as polyethylene wax and 1-alkene polymer. The compounds modified with a functional group-containing compound such as an acid modified compound can be also used.), silicone compounds (excluding the component B of the present invention. Examples thereof include linear or cyclic polydimethylsiloxane oil and polymethylphenyl silicone oil. The compounds modified with a functional group-containing compound such as an acid modified compound can be also used), fluorine compounds (such as fluorine oil typified by polyfluoroalkyl ether), paraffin wax and beeswax. Out of these, saturated fatty acid esters, linear and cyclic polydimethylsiloxane oil and polymethylphenyl silicone oil, and fluorine oil are preferred. Saturated fatty acid esters such as monoglycerides including monoglyceride stearate, polyglycerin fatty acid esters including decaglycerin decastearate and decaglycerin tetrastearate, lower fatty acid esters including stearate stearate, higher fatty acid esters including behenate sebacate, and erythritol esters including pentaerythritol tetrastearate are more preferably used. The content of the release agent is preferably 0.01 to 0.3 part by weight based on 100 parts by weight of the aromatic polycarbonate resin (component A).

(Optical Stabilizer)

The resin composition of the present invention may comprise an optical stabilizer. Examples of the optical stabilizer include bis(2,2,6,6-tetramethyl-4-piperidyl)sebacate, bis(1,2,2,6,6-pentamethyl-4-piperidyl)sebacate, bis(1,2,2,6,6-pentamethyl-4-piperidyl)-2-(3,5-di-tert-butyl-4-hydroxybenzyl)-2n-butyl malonate, condensate of 1,2,3,4-butanecarboxylic acid, 2,2,6,6-tetramethyl-4-piperidinol and tridecyl alcohol, condensate of 1,2,3,4-butanedicarboxylic acid, 1,2,2,6,6-pentamethyl-4-piperidinol and tridecyl alcohol, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, poly{[6-(1,1,3,3-tetramethylbutyl)amino-1,3,5-triazin-2,4-diyl][(2,2,6,6-tetramethylpiperidyl)imino]hexamethylene[(2,2,6,6-tetramethylpiperidyl)imino]}, poly{[6-morpholino-2-triazin-2,4-diyl][(2,2,6,6-tetramet hylpiperidyl)imino]hexamethylene[(2,2,6,6-tetramethylpiperidyl)imino]}, condensate of 1,2,3,4-butanetetracarboxylic acid, 2,2,6,6-tetramethyl-4-piperidinol and β,β,β',β'-tetramethyl-3,9-(2,4,8,10-tetraoxaspiro[5,5]undecane)diethanol, condensate of N,N'-bis(3-aminopropyl)ethylenediamine and 2,4-bis[N-butyl-N-(1,2,2,6,6-pentamethyl-4-piperidyl)amino]-chloro-1,3,5-triazine, condensate of 1,2,3,4-butanetetracarboxylic acid, 1,2,2,6,6-pentamethyl-4-piperidinol and β,β,β',β'-tetramethyl-3,9-(2,4,8,10-tetraoxaspiro[5,5]undecane)diethanol, and hindered amines typified by polymethylpropyl-3-oxy-[4-(2,2,6,6-tetramethyl) piperidinyl]siloxane.

The content of the optical stabilizer is preferably 0.01 to 5 parts by weight, more preferably 0.02 to 1 part by weight based on 100 parts by weight of the aromatic polycarbonate resin (component A).

(Bluing Agent)

The resin composition of the present invention may comprise a bluing agent to erase a yellow tint based on an ultraviolet absorbent. A bluing agent which is generally used for polycarbonate resin may be used without any problem. Anthraquinone-based dyes are easily acquired and preferred. Examples of the bluing agent include Solvent Violet 13 (general name) [CA. No. (color index No) 60725; trade mark: "Macrolex Violet B" of Bayer AG, "Dia Resin Blue G" of Mitsubishi Chemical Co., Ltd. and "Sumiplast Violet B" of Sumitomo Chemical Co., Ltd.], Solvent Violet 31 (general name) [CA. No 68210; trade mark: "Dia Resin Violet D" of Mitsubishi Chemical Co., Ltd.], Solvent Violet 33 (general name) [CA. No 60725; trade mark: "Dia Resin Blue J" of Mitsubishi Chemical Co., Ltd.], Solvent Blue 94 (general name) [CA. No. 61500; trade mark: "Dia Resin Blue N" of Mitsubishi Chemical Co., Ltd.], Solvent Violet 36 (general name) [CA. No 68210; trade mark: "Macrolex Violet 3R" of Bayer AG], Solvent Blue 97 (general name) [trade mark; "Macrolex Blue RR" of Bayer AG] and Solvent Blue 45 (general name) [CA. No 61110; trade mark: "Tetrasol Blue RLS" of Sandoz AG]. "Macrolex Blue RR", "Macrolex Violet B" and "Terasol Blue RLS" are particularly preferred. The content of the bluing agent is preferably 0.000005 to 0.0010 part by weight, more preferably 0.00001 to 0.0001 part by weight based on 100 parts by weight of the aromatic polycarbonate resin (component A).

(Drip Inhibitor)

Although the resin composition of the present invention has excellent drip prevention property, to further strengthen this performance, an ordinary drip inhibitor may be used. However, the content of the drip inhibitor is suitably not more than 0.2 part by weight, preferably not more than 0.1 part by weight, more preferably not more than 0.08 part by weight, much more preferably not more than 0.05 part by weight based on 100 parts by weight of the component A to ensure that the transparency of the resin composition of the present invention is not impaired. An example of the drip inhibitor is a fluorine-containing polymer having fibril formability. Polytetrafluoroethylene (may be abbreviated as "PTFE" hereinafter) is particularly preferred. The expression "transparency is not impaired" means that PTFE is used in an amount that ensures that the haze of a 2 mm-thick plate does not exceed 5%. PTFE having fibril formability has an extremely high molecular weight, and PTFE's may be bonded by an external function such as shear force to become fibrous. The number average molecular weight obtained from the standard specific gravity of PTFE is preferably 1,000,000 to 10,000,000, more preferably 2,000,000 to 9,000,000. PTFE in the form of a solid or an aqueous dispersion may be used. A mixture of PTFE having fibril formability and another resin may be used to improve dispersibility in a resin and obtain more excellent flame retardancy and transparency. Commercially available products of the PTFE mixture include Metabrene A 3000 (trade name), Metabrene A3700 (trade name) and Metabrene A3750 (trade name) of Mitsubishi Rayon Co., Ltd. and BLENDEX B449 (trade name) of GE Specialty Chemicals.

<Production of Resin Composition>

The resin composition of the present invention can be manufactured by an arbitrary method. For example, the component A, the flame retardant and other optional components are fully mixed together by using pre-mixing means such as a twin-cylinder mixer, Henschel mixer, mechanochemical device or extrusion mixer. Thereafter, the resulting mixture is optionally granulated by means of an extrusion granulator or briquetting machine, melt kneaded by means of a melt kneader typified by a vented double-screw extruder and then pelletized by means of a device such as a pelletizer.

Alternatively, a method in which the components A and B and optionally other components are supplied into a melt kneader typified by a vented double-screw extruder independently, a method in which the component A and some of other components are pre-mixed together and supplied into a melt kneader together with the remaining components independently, or a method in which the component B is diluted with water or an organic solvent and the resulting mixture is supplied into a melt kneader, or the diluted mixture is premixed with the other components and the obtained mixture is supplied into a melt kneader may be employed. When there is a liquid component to be mixed, a liquid injection device or a liquid adder may be used to supply it into the melt kneader.

The resin composition of the present invention is excellent inflame retardancy. A 1.5 mm-thick molded article of the resin composition of the present invention can achieve UL94 V-0 flame retardancy.

<Molded Article>

Various products can be manufactured by obtaining molded articles by injection molding a pellet produced from the resin composition of the present invention. They may be manufactured by employing not only ordinary cold runner molding techniques but also hot runner molding techniques which can eliminate use of a runner in injection molding. As for injection molding, ordinary molding techniques but also gas assist injection molding, injection compression molding, super high-speed injection molding, injection press molding, double-color molding, sandwich molding, in-mold coating molding, insert molding, foam molding (including a method for injecting a supercritical fluid), quick heating and cooling molding, insulated runner molding and in-mold re-melt molding techniques and combinations thereof may be employed. A molded article can be obtained by the rotational molding of the resin composition of the present invention without melt kneading it.

The resin composition of the present invention provides a molded article having excellent transparency. The haze of a 2 mm-thick molded article having an arithmetic average roughness (Ra) of not more than 0.03 µm molded from the transparent resin composition of the present invention is preferably 0.05 to 10.0%, more preferably 0.05 to 5.0%, much more preferably 0.05 to 2.0%, most preferably 0.1 to 1.0%. Thus, the resin composition of the present invention is suitable for obtaining a molded article having excellent transparency. The resin composition of the present invention can be advantageously used to obtain various molded article which must have transparency and high flame retardancy. Further, since the resin composition of the present invention has excellent transparency, a molded article having excellent transparency and a bright color can be obtained by using a pigment or a dye.

A lighting cover having a thickness of a thickest portion of 1.5 mm or less is an example of the molded article.

Further, molded articles formed from the resin composition can be subjected to various surface treatments. The surface treatments include decorative coating, hard coating, water-repellent and oil-repellent coating, hydrophilic coating, ultraviolet light absorption coating, infrared light absorption coating, electromagnetic wave absorption coating, heat-generating coating, antistatic coating, anti-electrification coating, conductive coating and metallizing (such as plating, chemical vapor deposition (CVD), physical vapor deposition (PVD) and thermal spray). A transparent sheet coated with a transparent conductive layer is particularly preferred.

EXAMPLES

The following examples are provided for the purpose of further illustrating the present invention but are in no way to be taken as limiting.

Examples 1 to 29 and Comparative Examples 1 to 6

Preparation of Resin Composition

Resin compositions in Tables 1 to 3 were prepared as follows. Symbols in these tables are used for explanation. Components in a ratio shown in Tables 1 to 3 were weighed and uniformly mixed together by means of a tumbler, and the resulting mixtures were each injected into an extruder to prepare resin compositions. A vented double-screw extruder having a diameter of 30 mm (KTX-30 of Kobe Steel, Ltd.) was used as the extruder. As for screw configuration, a first kneading zone (consisted of 2 feed kneading disks, 1 feed rotor, 1 return rotor and 1 return kneading disk) was located before the position of the vent, and a second kneading zone (consisted of 1 feed rotor and 1 return rotor) was located after the position of the vent. A strand was extruded at a cylinder temperature of 290° C., a dice temperature of 290° C. and a vent suction degree of 3,000 Pa, cooled in a water bath and cut with a pelletizer to obtain a pellet. The obtained pellet was molded into a test specimen for the evaluation of flame retardancy and transparency by the above method.

(Evaluation)

The resin compositions were evaluated by the following methods.

(i) Transparency

The pellet obtained from each composition was dried at 120° C. for 6 hours with a hot air drier and molded into a plate having a length of 150 mm, a width of 150 mm, a thickness of 2.0 mm and an Ra of 0.03 µm at a cylinder temperature of 320° C. and a mold temperature of 80° C. by means of an injection molding machine [SG150U• S-M IV of Sumitomo Heavy Industries, Ltd.] to measure its haze in accordance with JIS K7105. The pellet is evaluated as ○ when its haze is not more than 2%, as Δ when its haze is more than 2% and less than 20% and as x when its haze is not less than 20%.

(ii) Flame Retardancy

The pellet obtained from the composition of each Example was dried at 120° C. for 6 hours with a hot air circulation drier and molded into a test specimen for the evaluation of flame retardancy at a cylinder temperature of 320° C. and a mold temperature of 80° C. by means of an injection molding machine [IS150EN-5Y of Toshiba Machine Co., Ltd.]. An UL94 vertical burn test was made on specimens having a thickness of 2.2 mm, 1.5 mm and 1.2 mm to evaluate their flame retardancies. When the specimen cannot attain V-0, V-1 or V-2 rating, it is evaluated as "notV".

(iii) Notched Sharpy Impact Strength

The pellet obtained from the composition of each Example was dried at 120° C. for 6 hours with a hot air circulation drier and molded into a test specimen at a cylinder temperature of 320° C. and a mold temperature of 80° C. by means of an injection molding machine [IS150EN-5Y of Toshiba Machine Co., Ltd.]. A notched Sharpy impact strength test was made on this test specimen in accordance with ISO179. The notched Sharpy impact strength is preferably 3 to 100 kJ/m$^2$, more preferably 5 to 50 kJ/m$^2$, much more preferably 7 to 30 kJ/m$^2$.

Examples 30 to 45 and Comparative Examples 7 to 15

Resin compositions shown in Tables 4 to 6 were prepared as follows. Symbols in these tables are used for explanation. Components in a ratio shown in Tables 4 to 6 were weighed and uniformly mixed together by means of a tumbler, and the resulting mixtures were each injected into an extruder to prepare resin compositions. A vented double-screw extruder having a diameter of 30 mm (KTX-30 of Kobe Steel, Ltd.) was used as the extruder. As for screw configuration, a first kneading zone (consisted of 2 feed kneading disks, 1 feed rotor, 1 return rotor and 1 return kneading disk) was located before the position of the vent, and a second kneading zone (consisted of 1 feed rotor and 1 return rotor) was located after the position of the vent. A strand was extruded at a cylinder temperature of 290° C., a dice temperature of 290° C. and a vent suction degree of 3,000 Pa, cooled in a water bath and cut with a pelletizer to obtain a pellet. The obtained pellet was molded into a test specimen for the evaluation of flame retardancy and transparency by the above method.

(Evaluation)

The resin compositions were evaluated by the following methods.

(i) Flame Retardancy

The pellet obtained from the composition of each Example was dried at 120° C. for 6 hours with a hot air circulation drier and molded into a test specimen for the evaluation of flame retardancy at a cylinder temperature of 320° C. and a mold temperature of 80° C. by means of an injection molding machine [IS150EN-5Y of Toshiba Machine Co., Ltd.]. An UL94 vertical burn test was made on specimens having a thickness of 2.2 mm and 1.5 mm to evaluate their flame retardancies. When the specimen cannot attain V-0, V-1 or V-2 rating, it is evaluated as "notV".

(ii) Optical Properties (ii-1) total light transmittance: The pellet obtained from the composition of each Example was dried at 120° C. for 6 hours with a hot air circulation drier and molded into a 2.0 mm-thick flat plate-like test specimen measuring 150 mm per side at a cylinder temperature of 330° C. and a mold temperature of 80° C. by means of an injection molding machine [IS150EN-5Y of Toshiba Machine Co., Ltd.] to measure its transmittance in the thickness direction by means of the HR-100 haze meter of Murakamai Color Research Laboratory in accordance with JIS-K 7136.

(ii-2) diffusion light transmittance: The diffusion light transmittance in the thickness direction of the above 2 mm-thick flat plate-like test specimen measuring 150 mm per side was measured by means of the HR-100 haze meter of Murakamai Color Research Laboratory in accordance with JIS-K 7136.

(ii-3) degree of diffusion: The degree of diffusion of the above 2 mm-thick flat plate-like test specimen measuring 150 mm per side was measured by using the deflection angle photometer of Nippon Shikisai Gijutsu Kenkyuusho. The measurement method is shown in FIG. 2. The degree of diffusion indicates an angle γ at which the amount of transmitted light becomes 50 when the amount of transmitted light is 100 at γ of 0° at which light is applied at right angle to one side of the test specimen from above in FIG. 2.

(ii-4) surface emission: A 4 mm-thick flat plate-like test specimen measuring 150 mm per side molded under the same conditions as above was placed upon a 2 mm-thick white reflection plate measuring 150 mm per side and having a reflectance of 90%, and a cold cathode-ray tube having a diameter of 3 mm and a length of 170 mm was installed on the side surface of the test specimen to visually check light emission from the test specimen. The test specimen is evaluated as ○ when the light emitting surface is bright, as Δ when the light-emitting surface is slightly dark and as x when the light-emitting surface is dark.

(iii) Appearance

The surface appearances of three-stage plates having thicknesses of 1 mm, 2 mm and 3 mm which were molded under the same conditions as the test specimens for the evaluation of flame retardancy were visually checked. The test specimen is evaluated as ○ when it has a shiny surface and as x when the test specimen has no shiny surface The used raw materials shown in Tables 1 to 6 are as follows.

(Component A-1)

(PC-B9H: aromatic polycarbonate resin having a branched structure with a branching ratio of 0.97 mol % and a molecular weight of 25,100)

PC-B9H was prepared as follows. 2,340 parts of ion exchange water, 947 parts of a 25% sodium hydroxide aqueous solution and 0.7 part of hydrosulfite were fed to a reactor equipped with a thermometer, a stirrer and a reflux condenser, 710 parts of bisphenol A was dissolved under agitation (bisphenol A solution), 2,299 parts of methylene chloride, 112 parts of a 48.5% sodium hydroxide aqueous solution and 38.1 parts (1.00 mol %) of an aqueous solution prepared by dissolving 1,1,1-tris(4-hydroxyphenyl)ethane in a 14% sodium hydroxide aqueous solution to a concentration of 25% were added to the resulting solution, and 354 parts of phosgene was blown into the reactor at 15 to 25° C. for about 90 minutes to carry out a phosgene reaction.

After the end of the phosgene reaction, 219 parts of a 11% methylene chloride solution of p-tert-butylphenol and 88 parts of a 48.5% sodium hydroxide aqueous solution were added, stirring was suspended, the resulting solution was left for 10 minutes and separated, stirring was carried to emulsify the solution, and five minutes after that, the obtained emulsion was treated 35 times at a revolution of 1,200 rpm by means of a homomixer (manufactured by Tokushu Kika Kogyo Co., Ltd.) to obtain a highly emulsified dope. This highly emulsified dope was reacted in a polymerization tank (having a stirrer) at a temperature of 35° C. for 3 hours under no agitation to complete polymerization.

After the end of the reaction, 5,728 parts of methylene chloride was added to dilute the reaction mixture, a methylene chloride phase was separated from the reaction mixture, 5,000 parts of ion exchange water was added to and mixed with the separated methylene chloride phase under agitation, stirring was suspended, and a water phase and an organic phase were separated from each other. Then, aqueous cleaning was repeated until the electric conductivity of the water phase became almost equal to that of ion exchange water to obtain a purified polycarbonate resin solution. Then, methylene chloride was evaporated from the purified polycarbonate resin solution at a liquid temperature of 75° C. in a 1,000-liter kneader filled with 100 liters of ion exchange water to obtain a powder-particle product. 25 parts of the powder-particle product and 75 parts of water were injected into a hot-water treating tank equipped with a stirrer and mixed together at a water temperature of 95° C. for 30 minutes under agitation.

Thereafter, the obtained mixture of the powder-particle product and water was separated by a centrifugal machine to obtain a powder-particle product containing 0.5 wt % of methylene chloride and 45 wt % of water. This powder-particle product was continuously supplied into a conductive heat receiving groove type double-screw stirring continuous drier made of SUS316L controlled at 140° C. at a rate of 50 kg/hr (in terms of polycarbonate resin) to be dried for an average drying time of 3 hours so as to obtain a polycarbonate resin powder-particle product having a branched structure. This polycarbonate resin having a branched structure obtained as described above had a viscosity average molecular weight of 25,100 and a branching ratio of 0.97 mol %.

(PC-B9L: aromatic polycarbonate resin having a branched structure with a branching ratio of 0.95 mol % and a molecular weight of 20,300)

PC-B9L was prepared as follows. A polycarbonate resin powder-particle product having a branched structure was obtained in the same manner as PC-B9H except that the amount of the 11% methylene chloride solution of p-tert-butylphenol was changed to 261 parts. The polycarbonate resin having a branched structure obtained as described above had a viscosity average molecular weight of 20,300 and a branching ratio of 0.95 mol %.

(PC-B7: aromatic polycarbonate resin having a branched structure with a branching ratio of 0.71 mol % and a molecular weight of 25,200)

PC-B7 was prepared as follows. A polycarbonate resin powder-particle product having a branched structure was obtained in the same manner as PC-B9H except that 352 parts of phosgene, 28.6 parts (0.75 mol %) of an aqueous solution prepared by dissolving 1,1,1-tris(4-hydroxyphenyl)ethane in a 14% sodium hydroxide aqueous solution to a concentration of 25% and 209 parts of a 11% methylene chloride solution of p-tert-butylphenol were used. The polycarbonate resin having a branched structure obtained as described above had a viscosity average molecular weight of 25,200 and a branching ratio of 0.71 mol %.

(PC-B12: aromatic polycarbonate resin having a branched structure with a branching ratio of 1.2 mol % and a molecular weight of 25,000)

PC-B12 was prepared as follows. A polycarbonate resin powder-particle product having a branched structure was obtained in the same manner as PC-B9H except that 356 parts of phosgene, 47.6 parts (1.25 mol %) of an aqueous solution prepared by dissolving 1,1,1-tris(4-hydroxyphenyl)ethane in a 14% sodium hydroxide aqueous solution to a concentration of 25% and 229 parts of a 11% methylene chloride solution of p-tert-butylphenol were used. The polycarbonate resin having a branched structure obtained as described above had a viscosity average molecular weight of 25,000 and a branching ratio of 1.2 mol %.

(PC-B6: aromatic polycarbonate resin having a branched structure with a branching ratio of 0.66 mol % and a molecular weight of 25,200, for comparison)

PC-B6 was prepared as follows. A polycarbonate resin powder-particle product having a branched structure was obtained in the same manner as PC-B9H except that 352 parts of phosgene, 26.7 parts (0.70 mol %) of an aqueous solution prepared by dissolving 1,1,1-tris(4-hydroxyphenyl)ethane in a 14% sodium hydroxide aqueous solution to a concentration of 25% and 206 parts of a 11% methylene chloride solution of p-tert-butylphenol were used. The polycarbonate resin having a branched structure obtained as described above had a viscosity average molecular weight of 25,200 and a branching ratio of 0.66 mol %.

(PC-B2: aromatic polycarbonate resin having a branched structure with a branching ratio of 0.28 mol % and a molecular weight of 25,000, for comparison)

PC-B2 was prepared as follows. A polycarbonate resin powder-particle product having a branched structure was obtained in the same manner as PC-B9H except that 348 parts of phosgene, 10.7 parts (0.28 mol %) of an aqueous solution prepared by dissolving 1,1,1-tris(4-hydroxyphenyl)ethane in a 14% sodium hydroxide aqueous solution to a concentration of 25% and 160 parts of a 11% methylene chloride solution of p-tert-butylphenol were used. The polycarbonate resin having a branched structure obtained as described above had a viscosity average molecular weight of 25,000 and a branching ratio of 0.28 mol %.

(PC-B15H-a: aromatic polycarbonate resin having a branched structure with a branching ratio of 1.52 mol % and a molecular weight of 24,800)

PC-B15H-a was prepared as follows. 2,340 parts of ion exchange water, 947 parts of a 25% sodium hydroxide aqueous solution and 0.7 part of hydrosulfite were fed to a reactor equipped with a thermometer, a stirrer and a reflux condenser, 710 parts of bisphenol A was dissolved under agitation (bisphenol A solution), 2,299 parts of methylene chloride, 112 parts of a 48.5% sodium hydroxide aqueous solution and 61.0 parts (1.60 mol %) of an aqueous solution prepared by dissolving 1,1,1-tris(4-hydroxyphenyl)ethane in a 14% sodium hydroxide aqueous solution to a concentration of 25% were added to the resulting solution, and 357 parts of phosgene was blown into the reactor at 15 to 25° C. for about 90 minutes to carry out a phosgene reaction. After the end of the phosgene reaction, 245 parts of a 11% methylene chloride solution of p-tert-butylphenol and 88 parts of a 48.5% sodium hydroxide aqueous solution were added, stirring was suspended, the resulting solution was left for 10 minutes and separated, stirring was carried to emulsify the solution, and five minutes after that, the obtained emulsion was treated 35 times at a revolution of 1,200 rpm by means of a homomixer (manufactured by Tokushu Kika Kogyo Co., Ltd.) to obtain a highly emulsified dope. This highly emulsified dope was reacted in a polymerization tank (having a stirrer) at a temperature of 35° C. for 3 hours under no agitation to complete polymerization. After the end of the reaction, 5,728 parts of methylene chloride was added to dilute the reaction mixture, a methylene chloride phase was separated from the reaction mixture, 5,000 parts of ion exchange water was added to and mixed with the separated methylene chloride phase under agitation, stirring was suspended, and a water phase and an organic phase were separated from each other. Then, aqueous cleaning was repeated until the electric conductivity of the water phase became almost equal to that of ion exchange water to obtain a purified polycarbonate resin solution. Then, methylene chloride was evaporated from the purified polycarbonate resin solution at a liquid temperature of 75° C. in a 1,000-liter kneader filled with 100 liters of ion exchange water to obtain a powder-particle product. 25 parts of the powder-particle product and 75 parts of water were injected into a hot-water treating tank equipped with a stirrer and mixed together at a water temperature of 95° C. for 30 minutes under agitation. Thereafter, the obtained mixture of the powder-particle product and water was separated by a centrifugal machine to obtain a powder-particle product containing 0.5 wt % of methylene chloride and 45 wt % of water. This powder-particle product was continuously supplied into a conductive heat receiving groove type double-screw stirring continuous drier made of SUS316L controlled at 140° C. at a rate of 50 kg/hr (in terms of polycarbonate resin) to be dried for an average drying time of 3 hours so as to obtain a polycarbonate resin powder-particle product having a branched structure. The polycarbonate resin having a branched structure obtained as described above had a viscosity average molecular weight of 24,800 and a branching ratio of 1.52 mol %.

(PC-B12L-a: aromatic polycarbonate resin having a branched structure with a branching ratio of 1.27 mol % and a molecular weight of 20,200)

PC-B12L-a was prepared as follows. A polycarbonate resin powder-particle product having a branched structure was obtained in the same manner as PC-B15H-a except that 358 parts of phosgene, 53.3 parts (1.40 mol %) of an aqueous solution prepared by dissolving 1,1,1-tris(4-hydroxyphenyl)ethane in a 14% sodium hydroxide aqueous solution to a concentration of 25% and 276 parts of a 11% methylene chloride solution of p-tert-butylphenol were used. The polycarbonate resin having a branched structure obtained as described above had a viscosity average molecular weight of 20, 200 and a branching ratio of 1.27 mol %.

(PC-B9H-a: aromatic polycarbonate resin having a branched structure with a branching ratio of 0.96 mol % and a molecular weight of 25,100)

PC-B9H-a was prepared as follows. A polycarbonate resin powder-particle product having a branched structure was obtained in the same manner as PC-B15H-a except that 354 parts of phosgene, 38.1 parts (1.00 mol %) of an aqueous solution prepared by dissolving 1,1,1-tris(4-hydroxyphenyl)ethane in a 14% sodium hydroxide aqueous solution to a concentration of 25% and 219 parts of a 11% methylene chloride solution of p-tert-butylphenol were used. The polycarbonate resin having a branched structure obtained as described above had a viscosity average molecular weight of 25,100 and a branching ratio of 0.96 mol %.

(PC-B9L-a: aromatic polycarbonate resin having a branched structure with a branching ratio of 0.91 mol % and a molecular weight of 20,100)

PC-B9L-a was prepared as follows. A polycarbonate resin powder-particle product having a branched structure was obtained in the same manner as PC-B15H-a except that 355 parts of phosgene, 38.1 parts (1.00 mol %) of an aqueous solution prepared by dissolving 1,1,1-tris(4-hydroxyphenyl)ethane in a 14% sodium hydroxide aqueous solution to a concentration of 25% and 262 parts of a 11% methylene chloride solution of p-tert-butylphenol were used. The polycarbonate resin having a branched structure obtained as described above had a viscosity average molecular weight of 20,100 and a branching ratio of 0.91 mol %.

(PC-B7H-a: aromatic polycarbonate resin having a branched structure with a branching ratio of 0.72 mol % and a molecular weight of 25,000)

PC-B7H-a was prepared as follows. A polycarbonate resin powder-particle product having a branched structure was obtained in the same manner as PC-B15H-a except that 352 parts of phosgene, 29.0 parts (0.76 mol %) of an aqueous solution prepared by dissolving 1,1,1-tris(4-hydroxyphenyl)ethane in a 14% sodium hydroxide aqueous solution to a concentration of 25% and 207 parts of a 11% methylene chloride solution of p-tert-butylphenol were used. The polycarbonate resin having a branched structure obtained as described above had a viscosity average molecular weight of 25,000 and a branching ratio of 0.72 mol %.

(PC-B7L-a: aromatic polycarbonate resin having a branched structure with a branching ratio of 0.74 mol % and a molecular weight of 20,100)

PC-B7L-a was prepared as follows. A polycarbonate resin powder-particle product having a branched structure was obtained in the same manner as PC-B15H-a except that 354 parts of phosgene, 30.5 parts (0.80 mol %) of an aqueous solution prepared by dissolving 1,1,1-tris(4-hydroxyphenyl)ethane in a14% sodium hydroxide aqueous solution to a concentration of 25% and 253 parts of an 11% methylene chloride solution of p-tert-butylphenol were used. The polycarbonate resin having a branched structure obtained as described above had a viscosity average molecular weight of 20,100 and a branching ratio of 0.74 mol %.

(PC-B6H-a: aromatic polycarbonate resin having a branched structure with a branching ratio of 0.67 mol % and a molecular weight of 25,100)

PC-B6H-a was prepared as follows. A polycarbonate resin powder-particle product having a branched structure was obtained in the same manner as PC-B15H-a except that 352 parts of phosgene, 27.1 parts (0.71 mol %) of an aqueous solution prepared by dissolving 1,1,1-tris(4-hydroxyphenyl)ethane in a 14% sodium hydroxide aqueous solution to a concentration of 25% and 205 parts of an 11% methylene chloride solution of p-tert-butylphenol were used. The polycarbonate resin having a branched structure obtained as described above had a viscosity average molecular weight of 25,100 and a branching ratio of 0.67 mol %.

(Component A-2)

PC-L1: linear polycarbonate resin (polycarbonate resin comprising bisphenol A and p-tert-butylphenol as a terminal capping agent and prepared by the phosgene method. The polycarbonate resin is produced without using an amine-based catalyst and has a terminal hydroxyl group content of 10 mol % based on the total of all the aromatic polycarbonate resin terminals and a viscosity average molecular weight of 25,500)

PC-L2: linear polycarbonate resin (polycarbonate resin comprising bisphenol A and p-tert-butylphenol as a terminal capping agent and prepared by the phosgene method. The polycarbonate resin is produced without using an amine-based catalyst and has a terminal hydroxyl group content of 10 mol % based on the total of all the aromatic polycarbonate resin terminals and a viscosity average molecular weight of 19,700)

PC-L3: linear polycarbonate resin (polycarbonate resin comprising bisphenol A and p-tert-butylphenol as a terminal capping agent and prepared by the phosgene method. The polycarbonate resin is produced without using an amine-based catalyst and has a terminal hydroxyl group content of 10 mol % based on the total of all the aromatic polycarbonate resin terminals and a viscosity average molecular weight of 15,500)
(Component C)
C-1: potassium perfluorobutanesulfonate (Megafac F-114P of Dainippon Ink and Chemicals, Inc.)
C-2: sodium perfluorobutanesulfonate (Megafac F-114S of Dainippon Ink and Chemicals, Inc.)
C-3: potassium diphenylsulfonesulfonate (KSS of UCB Japan Co., Ltd.)
(Component B)
(B-1: silicone compound containing an Si—H group and an aromatic group)

B-1 was prepared as follows. 301.9 g of water and 150 g of toluene were fed to a 1-liter flask equipped with a stirrer, a cooling device and a thermometer, and the inside temperature of the flask was reduced to 5° C. A mixture of 21.7 g of trimethyl chlorosilane, 23.0 g of methyl dichlorosilane, 12.9 g of dimethyl dichlorosilane and 76.0 g of diphenyl dichlorosilane was fed to a dropping funnel and added dropwise to the flask over 2 hours under agitation. During this, cooling was continued to keep the inside temperature of the flask at 20° C. or lower. After the end of addition, stirring was continued for 4 hours to age the mixture at an inside temperature of 20° C., the reaction mixture was left, the separated hydrochloric acid water layer was removed, a 10% sodium carbonate aqueous solution was added, stirred for 5 minutes and left, and the separated water phase was removed. Thereafter, the resulting product was washed in ion exchange water 3 times to confirm that a toluene layer became neutral. This toluene solution was heated up to an inside temperature of 120° C. under reduced pressure to remove toluene and low-boiling matter, and insoluble matter was removed by filtration to obtain a silicone compound B-1. This silicone compound B-1 had an Si—H group content of 0.21 mol/100 g, an aromatic group content of 49 wt % and an average polymerization degree of 8.0.

(B-2: silicone compound containing an Si—H group and an aromatic group)

B-2 was prepared as follows. 100.7 g of 1,1,3,3-tetramethyldisiloxane, 60.1 g of 1,3,5,7-tetramethylcyclotetrasiloxane, 129.8 g of octamethylcyclotetrasiloxane, 143.8 g of octaphenylcyclotetrasiloxane and 99.1 g of phenyl trimethoxysilane were fed to a 1-liter flask equipped with a stirrer, a cooling device and a thermometer, and 25.0 g of concentrated sulfuric acid was further added to the flask under agitation. After the inside temperature of the flask was reduced to 10° C., 13.8 g of water was added dropwise to the flask over 30 minutes under agitation. During this, cooling was continued to keep the inside temperature of the flask at 20° C. or lower. After the end of addition, stirring was continued for 5 hours to age the mixture at an inside temperature of 10 to 20° C., 8.5 g of water and 300 g of toluene were added, stirred for 30 minutes and left, and the separated water phase was removed. Thereafter, the resulting product was washed with a 5% sodium sulfate aqueous solution 4 times to confirm that a toluene layer became neutral. This toluene solution was heated up to an inside temperature of 120° C. under reduced pressure to remove toluene and low-boiling matter, and insoluble matter was removed by filtration to obtain a silicone compound B-2. This silicone compound B-2 had an Si—H group content of 0.50 mol/100 g, an aromatic group content of 30 wt % and an average polymerization degree of 10.95.

(B-3: silicone compound containing an Si—H group and an aromatic group)

B-3 was prepared as follows. 16.2 g of hexamethyldisiloxane, 61.0 g of 1,3,5,7-tetramethylcyclotetrasiloxane, 103.8 g of octamethylcyclotetrasiloxane and 391.0 g of diphenyl dimethoxysilane were fed to a 1-liter flask equipped with a stirrer, a cooling device and a thermometer, and 25.0 g of concentrated sulfuric acid was further added to the flask under agitation. After the inside temperature of the flask was reduced to 10° C., 29.4 g of water was added dropwise to the flask over 30 minutes under agitation. During this, cooling was continued to keep the inside temperature of the flask at 20° C. or lower. After the end of addition, stirring was continued for 5 hours to age the mixture at an inside temperature of 10 to 20° C., 8.5 g of water and 300 g of toluene were added, stirred for 30 minutes and left, and the separated water phase was removed. Thereafter, the resulting product was washed with a 5% sodium sulfate aqueous solution 4 times to confirm that a toluene layer became neutral. This toluene solution was heated up to an inside temperature of 120° C. under reduced pressure to remove toluene and low-boiling matter, and insoluble matter was removed by filtration to obtain a silicone compound B-3. This silicone compound B-3 had an Si—H group content of 0.20 mol/100 g, an aromatic group content of 50 wt % and an average polymerization degree of 42.0.

(B-4: silicone compound containing an Si—H group and an aromatic group)

B-4 was prepared as follows. 15.9 g of hexamethyldisiloxane, 147.3 g of 1,3,5,7-tetramethylcyclotetrasiloxane, 14.5 g of octamethylcyclotetrasiloxane and 395.1 g of diphenyl dimethoxysilane were fed to a 1-liter flask equipped with a stirrer, a cooling device and a thermometer, and 25.0 g of concentrated sulfuric acid was further added to the flask under agitation. After the inside temperature of the flask was reduced to 10° C., 29.7 g of water was added dropwise to the flask over 30 minutes under agitation. During this, cooling was continued to keep the inside temperature of the flask at 20° C. or lower. After the end of addition, stirring was continued for 5 hours to age the mixture at an inside temperature of 10 to 20° C., 8.5 g of water and 300 g of toluene were added, stirred for 30 minutes and left, and the separated water phase was removed. Thereafter, the resulting product was washed with a 5% sodium sulfate aqueous solution 4 times to confirm that a toluene layer became neutral. This toluene solution was heated up to an inside temperature of 120° C. under reduced pressure to remove toluene and low-boiling matter, and insoluble matter was removed by filtration to obtain a silicone compound B-4. This silicone compound B-4 had an Si—H group content of 0.49 mol/100 g, an aromatic group content of 50 wt % and an average polymerization degree of 45.5.

<Rational Formulas of Silicone Compounds>
B-1: $M_2 D^H_2 D_1 D^{\Phi 2}_3$
B-2: $M^H_3 D^H_2 D_{3.5} D^{\Phi 2}_{1.45} T^{\Phi}_1$
B-3: $M_2 D^H_{10} D_{14} D^{\Phi 2}_{16}$
B-4: $M_2 D^H_{25} D_2 D^{\Phi 2}_{16.5}$ The symbols in the above rational formulas denote the following siloxane units, and each of the coefficients (inferior letters) denotes the number of siloxane units contained in one molecule (degree of polymerization).
M: $(CH_3)_3 SiO_{1/2}$
$M^H$: $H(CH_3)_2 SiO_{1/2}$
D: $(CH_3)_2 SiO$
$D^H$: $H(CH_3) Si^\circ$
$D^{\Phi 2}$: $(C_6H_5)_2 SiO$
$T^{\Phi}$: $(C_6H_5) SiO_{3/2}$
B-5: silicone containing an aromatic group (KF56 of Shin-Etsu Chemical Co., Ltd.)
B-6: silicone containing an aromatic group (KR219 of Shin-Etsu Chemical Co., Ltd.)

(Component D)

D-1: bead-like crosslinked silicone (Tospal 120 (trade name) of Momentive Performance Materials Japan Joint Company, average particle diameter of 2 μm)

D-2: bead-like crosslinked silicone (Tospal 145 (trade name) of Momentive Performance Materials Japan Joint Company, average particle diameter of 5 μm)

D-3: bead-like crosslinked acrylic particles (MBX-5 (trade name) of Sekisui Plastics Co., Ltd., average particle diameter of 5 μm))

D-4: bead-like crosslinked acrylic particles (MBX-30 (trade name) of Sekisui Plastics Co., Ltd., average particle diameter of 30 μm)

D-5: calcium carbonate (Ciplon A (trade name) of Cypro Co., Ltd., average particle diameter of 10 μm)

(Component E)

E-1: benzotriazole-based ultraviolet absorbent (Chemisorb 79 of Chemipro Kasei Kaisha Ltd.)

(Component F)

F-1: fluorescent brightener (Hakkol PSR of Hakkol Chemical Co., Ltd.)

(Other Components)

IRS: phosphite compound (Irgafos168 of Ciba Specialty Chemicals Co., Ltd.)

IRx: hindered phenol-based antioxidant (Irganox1076 of Ciba Specialty Chemicals Co., Ltd.)

PEP: pentaerythritol diphosphite compound (Adecastab PEP-36 of ADEKA Corporation)

TM: trimethyl phosphate (TMP of Daihachi Chemical Industry Co., Ltd.)

VP: fatty acid ester comprising pentaerythritol tetrastearate as the main component (Loxiol VPG861 of Cognis Japan Co., Ltd.)

VB: bluing agent (Macrolex Violet B of Bayer AG)

PEPQ: tetrakis(di-t-butylphenyl)-biphenylene diphosphonite (Sandstab P-EPQ (trade name) of Clariant Japan Co., Ltd.)

L1: saturated fatty acid ester-based release agent (Rikemal SL900 of Riken Vitamin Co., Ltd.)

SN-3305: drip inhibitor (SN3305 of Shine Polymer Co., Ltd.)

TABLE 1

| | | | Unit | Example 1 | Example 2 | Example 3 | Example 4 | Example 5 | Example 6 |
|---|---|---|---|---|---|---|---|---|---|
| Composition | Component A-1 | PC-B9H | pbw | 100 | 100 | 100 | 100 | 100 | 100 |
| | | PC-B9L | pbw | | | | | | |
| | | PC-B7 | pbw | | | | | | |
| | | PC-B12 | pbw | | | | | | |
| | | PC-B6 | pbw | | | | | | |
| | | PC-B2 | pbw | | | | | | |
| | Component A-2 | PC-L1 | pbw | | | | | | |
| | | PC-L2 | pbw | | | | | | |
| | | PC-L3 | pbw | | | | | | |
| | Total of component A | | pbw | 100 | 100 | 100 | 100 | 100 | 100 |
| | Branching ratio of component A | | mol % | 0.97 | 0.97 | 0.97 | 0.97 | 0.97 | 0.97 |
| | Component C | C-1 | mol % | 0.010 | 0.015 | 0.024 | 0.024 | 0.024 | 0.024 |
| | | C-2 | mol % | | | | | | |
| | | C-3 | mol % | | | | | | |
| | Component B | B-1 | mol % | 0.50 | 0.50 | 0.50 | | | |
| | | B-2 | mol % | | | | 0.50 | | |
| | | B-3 | mol % | | | | | 0.50 | |
| | | B-4 | mol % | | | | | | 0.50 |
| | | B-5 | mol % | | | | | | |
| | | B-6 | mol % | | | | | | |
| | Others | IRS | mol % | | | | | | |
| | | IRX | mol % | | | | | | |
| | | PEP | mol % | | | | | | |
| | | TM | mol % | | | | | | |
| | | VP | mol % | | | | | | |
| | | E-1 | mol % | | | | | | |
| | | VB | mol % | | | | | | |
| Material characteristic properties | Transparency | | | ○ | ○ | ○ | ○ | ○ | ○ |
| | Flame retardancy 2.2 mmt | Rating | — | V-0 | V-0 | V-0 | V-0 | V-0 | V-0 |
| | Flame retardancy 1.5 mmt | Rating | — | V-0 | V-0 | V-0 | V-0 | V-0 | V-0 |
| | Flame retardancy 1.2 mmt | Rating | — | V-2 | V-2 | V-1 | V-1 | V-1 | V-2 |

| | | | Unit | Example 7 | Example 8 | Example 9 | Example 10 | Example 11 | Example 12 |
|---|---|---|---|---|---|---|---|---|---|
| Composition | Component A-1 | PC-B9H | pbw | 100 | 100 | 100 | 100 | 100 | 100 |
| | | PC-B9L | pbw | | | | | | |
| | | PC-B7 | pbw | | | | | | |
| | | PC-B12 | pbw | | | | | | |
| | | PC-B6 | pbw | | | | | | |
| | | PC-B2 | pbw | | | | | | |

TABLE 1-continued

|  |  |  | | | | | | | |
|---|---|---|---|---|---|---|---|---|---|
| | Component A-2 | PC-L1 | pbw | | | | | | |
| | | PC-L2 | pbw | | | | | | |
| | | PC-L3 | pbw | | | | | | |
| | Total of component A | | pbw | 100 | 100 | 100 | 100 | 100 | 100 |
| | Branching ratio of component A | | mol % | 0.97 | 0.97 | 0.97 | 0.97 | 0.97 | 0.97 |
| | Component C | C-1 | mol % | 0.024 | 0.05 | 0.05 | 0.05 | 0.05 | 0.08 |
| | | C-2 | mol % | | | | | | |
| | | C-3 | mol % | | | | | | |
| | Component B | B-1 | mol % | 1.00 | 0.10 | | | 0.50 | 1.00 |
| | | B-2 | mol % | | | | | | |
| | | B-3 | mol % | | | | | | |
| | | B-4 | mol % | | | | | | |
| | | B-5 | mol % | | | 0.1 | | | |
| | | B-6 | mol % | | | | 0.1 | | |
| | Others | IRS | mol % | | | | | | |
| | | IRX | mol % | | | | | | |
| | | PEP | mol % | | | | | | |
| | | TM | mol % | | | | | | |
| | | VP | mol % | | | | | | |
| | | E-1 | mol % | | | | | | |
| | | VB | mol % | | | | | | |
| Material characteristic properties | Transparency | | | ◯ | ◯ | ◯ | ◯ | ◯ | ◯ |
| | Flame retardancy 2.2 mmt | Rating | — | V-0 | V-0 | V-0 | V-0 | V-0 | V-0 |
| | Flame retardancy 1.5 mmt | Rating | — | V-0 | V-0 | V-0 | V-0 | V-0 | V-0 |
| | Flame retardancy 1.2 mmt | Rating | — | V-0 | V-0 | V-0 | V-2 | V-0 | V-0 | pbw: part by weight

TABLE 2

| | | | Unit | Example 13 | Example 14 | Example 15 | Example 16 | Example 17 |
|---|---|---|---|---|---|---|---|---|
| Composition | Component A-1 | PC-B9H | pbw | | | 100 | 100 | 100 |
| | | PC-B9L | pbw | 100 | | | | |
| | | PC-B7 | pbw | | 100 | | | |
| | | PC-B12 | pbw | | | | | |
| | | PC-B6 | pbw | | | | | |
| | | PC-B2 | pbw | | | | | |
| | Component A-2 | PC-L1 | pbw | | | | | |
| | | PC-L2 | pbw | | | | | |
| | | PC-L3 | pbw | | | | | |
| | Total of component A | | pbw | 100 | 100 | 100 | 100 | 100 |
| | Branching ratio of component A | | mol % | 0.95 | 0.71 | 0.97 | 0.97 | 0.97 |
| | Component C | C-1 | mol % | 0.10 | 0.024 | 0.005 | 0.05 | |
| | | C-2 | mol % | | | | | |
| | | C-3 | mol % | | | | | |
| | Component B | B-1 | mol % | 1.00 | 1.00 | | | 1.00 |
| | | B-2 | mol % | | | | | |
| | | B-3 | mol % | | | | | |
| | | B-4 | mol % | | | | | |
| | | B-5 | mol % | | | | | |
| | | B-6 | mol % | | | | | |
| | Others | IRS | mol % | | | | | |
| | | IRX | mol % | | | | | |
| | | PEP | mol % | | | | | |
| | | TM | mol % | | | | | |
| | | VP | mol % | | | | | |
| | | E-1 | mol % | | | | | |
| | | VB | mol % | | | | | |

TABLE 2-continued

| | | | | | | | | |
|---|---|---|---|---|---|---|---|---|
| Material characteristic properties | Transparency | | — | ○ | ○ | ○ | ○ | ○ |
| | Flame retardancy 2.2 mmt | Rating | — | V-0 | V-0 | V-0 | V-0 | V-0 |
| | Flame retardancy 1.5 mmt | Rating | — | V-0 | V-0 | V-2 | V-1 | V-2 |
| | Flame retardancy 1.2 mmt | Rating | — | V-0 | V-0 | V-2 | V-2 | V-2 |

| | | | Unit | C. Ex. 1 | C. Ex. 2 | C. Ex. 3 | C. Ex. 4 | C. Ex. 5 | C. Ex. 6 |
|---|---|---|---|---|---|---|---|---|---|
| Composition | Component A-1 | PC-B9H | pbw | 100 | 100 | 100 | | | |
| | | PC-B9L | pbw | | | | | | |
| | | PC-B7 | pbw | | | | | | |
| | | PC-B12 | pbw | | | | 100 | | |
| | | PC-B6 | pbw | | | | | 100 | |
| | | PC-B2 | pbw | | | | | | 100 |
| | Component A-2 | PC-L1 | pbw | | | | | | |
| | | PC-L2 | pbw | | | | | | |
| | | PC-L3 | pbw | | | | | | |
| | Total of component A | | pbw | 100 | 100 | 100 | 100 | 100 | 100 |
| | Branching ratio of component A | | mol % | 0.97 | 0.97 | 0.97 | 1.2 | 0.66 | 0.28 |
| | Component C | C-1 | mol % | 0.004 | | 0.024 | 0.024 | 0.024 | 0.024 |
| | | C-2 | mol % | | | | | | |
| | | C-3 | mol % | | | | | | |
| | Component B | B-1 | mol % | | 0.004 | 12.00 | 1.00 | 1.00 | 0.50 |
| | | B-2 | mol % | | | | | | |
| | | B-3 | mol % | | | | | | |
| | | B-4 | mol % | | | | | | |
| | | B-5 | mol % | | | | | | |
| | | B-6 | mol % | | | | | | |
| | Others | IRS | mol % | | | | | | |
| | | IRX | mol % | | | | | | |
| | | PEP | mol % | | | | | | |
| | | TM | mol % | | | | | | |
| | | VP | mol % | | | | | | |
| | | E-1 | mol % | | | | | | |
| | | VB | mol % | | | | | | |
| Material characteristic properties | Transparency | | | ○ | ○ | X | X | ○ | ○ |
| | Flame retardancy 2.2 mmt | Rating | — | V-2 | V-2 | V-2 | V-0 | V-0 | V-2 |
| | Flame retardancy 1.5 mmt | Rating | — | V-2 | V-2 | V-2 | V-0 | V-0 | V-2 |
| | Flame retardancy 1.2 mmt | Rating | — | V-2 | V-2 | V-2 | V-0 | V-2 | V-2 | pbw: part by weight
C. Ex.: Comparative Example

TABLE 3

| | | | Unit | Example 18 | Example 19 | Example 20 | Example 21 | Example 22 | Example 23 |
|---|---|---|---|---|---|---|---|---|---|
| Composition | Component A-1 | PC-B9H | pbw | 80 | 80 | 80 | | 100 | 100 |
| | | PC-B9L | pbw | | | | 100 | | |
| | | PC-B7 | pbw | | | | | | |
| | | PC-B12 | pbw | | | | | | |
| | | PC-B6 | pbw | | | | | | |
| | | PC-B2 | pbw | | | | | | |
| | Component A-2 | PC-L1 | pbw | 20 | | | | | |
| | | PC-L2 | pbw | | 20 | | | | |
| | | PC-L3 | pbw | | | 20 | | | |
| | Total of component A | | pbw | 100 | 100 | 100 | 100 | 100 | 100 |
| | Branching ratio of component A | | mol % | 0.78 | 0.78 | 0.78 | 0.95 | 0.97 | 0.97 |
| | Component C | C-1 | mol % | 0.024 | 0.024 | 0.024 | 0.024 | | 0.024 |
| | | C-2 | mol % | | | | | | |
| | | C-3 | mol % | | | | | 0.050 | |

TABLE 3-continued

|  |  |  | Unit | | | | | | |
|---|---|---|---|---|---|---|---|---|---|
|  | Component B | B-1 | mol % | 1.00 | 1.00 | 1.00 | 2.00 |  |  |
|  |  | B-2 | mol % |  |  |  |  | 1.00 | 1.00 |
|  |  | B-3 | mol % |  |  |  |  |  |  |
|  |  | B-4 | mol % |  |  |  |  |  |  |
|  |  | B-5 | mol % |  |  |  |  |  |  |
|  |  | B-6 | mol % |  |  |  |  |  |  |
|  | Others | IRS | mol % |  |  |  |  |  |  |
|  |  | IRX | mol % |  |  |  | 0.01 |  |  |
|  |  | PEP | mol % |  |  |  |  | 0.03 | 0.03 |
|  |  | TM | mol % |  |  |  |  |  |  |
|  |  | VP | mol % |  |  |  | 0.2 | 0.2 | 0.2 |
|  |  | E-1 | mol % |  |  |  |  |  |  |
|  |  | VB | mol % |  |  |  | 0.00005 | 0.00007 | 0.00007 |
| Material characteristic properties | Transparency |  |  | ○ | ○ | ○ | ○ | ○ | ○ |
|  | Flame retardancy 2.2 mmt | Rating | — | V-0 | V-0 | V-0 | V-0 | V-0 | V-0 |
|  | Flame retardancy 1.5 mmt | Rating | — | V-0 | V-0 | V-0 | V-0 | V-0 | V-0 |
|  | Flame retardancy 1.2 mmt | Rating | — | V-0 | V-0 | V-0 | V-0 | V-0 | V-0 |

|  |  |  | Unit | Example 24 | Example 25 | Example 26 | Example 27 | Example 28 | Example 29 |
|---|---|---|---|---|---|---|---|---|---|
| Composition | Component A-1 | PC-B9H | pbw | 100 | 100 | 100 |  |  |  |
|  |  | PC-B9L | pbw |  |  |  | 100 | 100 | 100 |
|  |  | PC-B7 | pbw |  |  |  |  |  |  |
|  |  | PC-B12 | pbw |  |  |  |  |  |  |
|  |  | PC-B6 | pbw |  |  |  |  |  |  |
|  |  | PC-B2 | pbw |  |  |  |  |  |  |
|  | Component A-2 | PC-L1 | pbw |  |  |  |  |  |  |
|  |  | PC-L2 | pbw |  |  |  |  |  |  |
|  |  | PC-L3 | pbw |  |  |  |  |  |  |
|  | Total of component A |  | pbw | 100 | 100 | 100 | 100 | 100 | 100 |
|  | Branching ratio of component A |  | mol % | 0.97 | 0.97 | 0.97 | 0.95 | 0.95 | 0.95 |
|  | Component C | C-1 | mol % | 0.024 | 0.024 | 0.024 | 0.024 | 0.050 | 0.080 |
|  |  | C-2 | mol % |  |  |  |  |  |  |
|  |  | C-3 | mol % |  |  |  |  |  |  |
|  | Component B | B-1 | mol % | 0.50 | 1.00 | 2.00 | 1.00 | 0.50 | 1.00 |
|  |  | B-2 | mol % |  |  |  |  |  |  |
|  |  | B-3 | mol % |  |  |  |  |  |  |
|  |  | B-4 | mol % |  |  |  |  |  |  |
|  |  | B-5 | mol % |  |  |  |  |  |  |
|  |  | B-6 | mol % |  |  |  |  |  |  |
|  | Others | IRS | mol % |  |  |  |  | 0.01 |  |
|  |  | IRX | mol % | 0.01 | 0.01 | 0.03 |  |  |  |
|  |  | PEP | mol % |  |  |  |  |  | 0.03 |
|  |  | TM | mol % |  |  |  | 0.01 |  |  |
|  |  | VP | mol % | 0.2 |  |  | 0.3 |  |  |
|  |  | E-1 | mol % |  | 0.3 | 0.27 |  |  |  |
|  |  | VB | mol % | 0.00007 | 0.0001 | 0.0001 | 0.00007 | 0.00007 | 0.00005 |
| Material characteristic properties | Transparency |  |  | ○ | ○ | ○ | ○ | ○ | ○ |
|  | Flame retardancy 2.2 mmt | Rating | — | V-0 | V-0 | V-0 | V-0 | V-0 | V-0 |
|  | Flame retardancy 1.5 mmt | Rating | — | V-0 | V-0 | V-0 | V-0 | V-0 | V-0 |
|  | Flame retardancy 1.2 mmt | Rating | — | V-1 | V-0 | V-0 | V-2 | V-2 | V-2 | pbw: part by weight

TABLE 4

|  |  |  | Unit | Example 30 | Example 31 | Example 32 | Example 33 |
|---|---|---|---|---|---|---|---|
| Composition | Component A-1 | PC-B15H-a | pbw | | | | |
| | | PC-B12L-a | pbw | | | | |
| | | PC-B9H-a | pbw | 100 | 100 | 100 | 100 |
| | | PC-B9L-a | pbw | | | | |
| | | PC-B7H-a | pbw | | | | |
| | | PC-B7L-a | pbw | | | | |
| | | PC-B6H-a | pbw | | | | |
| | Component A-2 | PC-L1 | pbw | | | | |
| | Total of component A | | pbw | 100 | 100 | 100 | 100 |
| | Branching ratio of component A | | mol % | 0.96 | 0.96 | 0.96 | 0.96 |
| | Component B | B-1 | pbw | 0.500 | 0.500 | 0.5 | 0.5 |
| | | B-2 | pbw | | | | |
| | | B-3 | pbw | | | | |
| | Component C | C-1 | pbw | 0.024 | 0.024 | 0.024 | 0.024 |
| | | C-2 | pbw | | | | |
| | Component D | D-1 | pbw | | | | |
| | | D-2 | pbw | | | | |
| | | D-3 | pbw | 0.005 | 0.2 | 0.6 | 1.0 |
| | | D-4 | pbw | | | | |
| | | D-5 | pbw | | | | |
| | Component E | E-1 | pbw | 0.15 | 0.15 | 0.15 | 0.15 |
| | Component F | F-1 | pbw | 0.002 | 0.002 | 0.002 | 0.002 |
| | Others | PEPQ | pbw | 0.03 | 0.03 | 0.03 | 0.03 |
| | | IRX | pbw | 0.03 | 0.03 | 0.03 | 0.03 |
| | | L1 | pbw | | | | |
| | | SN3305 | pbw | | | | |
| Evaluation | Flame retardancy 2.2 mmt | Rating | — | V-0 | V-0 | V-0 | V-0 |
| | Flame retardancy 1.5 mmt | Rating | — | V-0 | V-0 | V-0 | V-0 |
| | optical properties 2 mmt | Total light transmittance | % | 90 | 88 | 82 | 75 |
| | | Diffusion light transmittance | % | 6 | 77 | 80 | 75 |
| | | Degree of diffusion | ° | 1.5 | 2 | 17 | 24 |
| | | Surface emission | — | ○ | ○ | ○ | ○ |
| | | Surface appearance | — | ○ | ○ | ○ | ○ | pbw: part by weight

TABLE 5

|  |  |  | Unit | Ex. 34 | Ex. 35 | Ex. 36 | Ex. 37 | Ex. 38 | Ex. 39 | Ex. 30 | Ex. 41 |
|---|---|---|---|---|---|---|---|---|---|---|---|
| Composition | Component A-1 | PC-B15H-a | pbw | | | | | | | | |
| | | PC-B12L-a | pbw | | | | | | | | |
| | | PC-B9H-a | pbw | 100 | 100 | | | | | | |
| | | PC-B9L-a | pbw | | | 100 | 100 | | | | |
| | | PC-B7H-a | pbw | | | | | 100 | 100 | | |
| | | PC-B7L-a | pbw | | | | | | | 100 | 100 |
| | | PC-B6H-a | pbw | | | | | | | | |
| | Component A-2 | PC-L1 | pbw | | | | | | | | |
| | Total of component A | | pbw | 100 | 100 | 100 | 100 | 100 | 100 | 100 | 100 |
| | Branching ratio of component A | | mol % | 0.96 | 0.96 | 0.91 | 0.91 | 0.72 | 0.72 | 0.74 | 0.74 |
| | Component B | B-1 | pbw | 1.0 | 1.0 | 1.0 | 2.0 | 2.0 | | | 2.0 |
| | | B-2 | pbw | | | | | | 2.0 | | |
| | | B-3 | pbw | | | | | | | 2.00 | |
| | Component C | C-1 | pbw | 0.024 | 0.024 | 0.050 | 0.024 | 0.024 | 0.024 | 0.024 | 0.100 |
| | | C-2 | pbw | | | | | | | | |
| | Component D | D-1 | pbw | | | | 0.20 | | | | |
| | | D-2 | pbw | | | | | | | | |
| | | D-3 | pbw | 1.0 | | 1.0 | | 1.0 | 1.0 | 1.0 | 1.0 |
| | | D-4 | pbw | | 2.0 | | | | | | |
| | | D-5 | pbw | | | | | | | | |

TABLE 5-continued

|  |  |  | Unit |  |  |  |  |  |  |  |  |
|---|---|---|---|---|---|---|---|---|---|---|---|
|  | Component E | E-1 | pbw | 0.15 | 0.15 | 0.15 | 0.15 | 0.15 | 0.15 | 0.15 | 0.15 |
|  | Component F | F-1 | pbw | 0.002 | 0.002 | 0.002 | 0.002 | 0.002 | 0.002 | 0.002 | 0.002 |
|  | Others | PEPQ | pbw | 0.03 | 0.03 |  | 0.03 |  |  |  | 0.03 |
|  |  | IRX | pbw | 0.03 | 0.03 |  | 0.03 |  |  |  | 0.03 |
|  |  | L1 | pbw |  |  |  |  |  |  |  |  |
|  |  | SN3305 | pbw |  |  |  |  |  |  |  |  |
| Evaluation | Flame retardancy 2.2 mmt | Rating | — | V-0 | V-0 | V-0 | V-0 | V-0 | V-0 | V-0 | V-0 |
|  | Flame retardancy 1.5 mmt | Rating | — | V-0 | V-0 | V-0 | V-0 | V-0 | V-0 | V-0 | V-0 |
|  | Optical properties 2 mmt | Total light transmittance | % | 75 | 82 | 75 | 75 | 75 | 75 | 75 | 75 |
|  |  | Diffusion light transmittance |  | 75 | 70 | 75 | 74 | 75 | 75 | 75 | 75 |
|  |  | Degree of diffusion | ° | 24 | 2 | 24 | 3 | 24 | 24 | 24 | 24 |
|  |  | Surface emission | — | ○ | ○ | ○ | ○ | ○ | ○ | ○ | ○ |
|  |  | Surface appearance | — | ○ | ○ | ○ | ○ | ○ | ○ | ○ | ○ |

|  |  |  | Unit | Example 42 | Example 43 | Example 44 | Example 45 |
|---|---|---|---|---|---|---|---|
| Composition | Component A-1 | PC-B15H-a | pbw |  |  |  |  |
|  |  | PC-B12L-a | pbw |  |  |  |  |
|  |  | PC-B9H-a | pbw |  |  |  |  |
|  |  | PC-B9L-a | pbw |  |  | 100 | 100 |
|  |  | PC-B7H-a | pbw |  |  |  |  |
|  |  | PC-B7L-a | pbw | 100 | 100 |  |  |
|  |  | PC-B6H-a | pbw |  |  |  |  |
|  | Component A-2 | PC-L1 | pbw |  |  |  |  |
|  |  | Total of component A | pbw | 100 | 100 | 100 | 100 |
|  |  | Branching ratio of component A | mol % | 0.74 | 0.74 | 0.91 | 0.91 |
|  | Component B | B-1 | pbw | 2.0 | 0.05 | 1.0 | 1.0 |
|  |  | B-2 | pbw |  |  |  |  |
|  |  | B-3 | pbw |  |  |  |  |
|  | Component C | C-1 | pbw | 0.070 | 0.9 | 0.024 | 0.024 |
|  |  | C-2 | pbw |  |  |  |  |
|  | Component D | D-1 | pbw |  |  |  |  |
|  |  | D-2 | pbw |  |  |  |  |
|  |  | D-3 | pbw | 1.0 | 1.0 | 1.0 |  |
|  |  | D-4 | pbw |  |  |  |  |
|  |  | D-5 | pbw |  |  |  | 3.0 |
|  | Component E | E-1 | pbw | 0.15 | 0.15 | 0.15 | 0.15 |
|  | Component F | F-1 | pbw | 0.002 | 0.002 | 0.002 | 0.002 |
|  | Others | PEPQ | pbw | 0.03 | 0.03 | 0.03 | 0.03 |
|  |  | IRX | pbw | 0.03 | 0.03 | 0.03 | 0.03 |
|  |  | L1 | pbw |  |  |  |  |
|  |  | SN3305 | pbw |  |  |  | 0.1 |
| Evaluation | Flame retardancy 2.2 mmt | Rating | — | V-0 | V-0 | V-0 | V-0 |
|  | Flame retardancy 1.5 mmt | Rating | — | V-0 | V-0 | V-0 | V-0 |
|  | Optical properties 2 mmt | Total light transmittance | % | 75 | 75 | 70 | 55 |
|  |  | Diffusion light transmittance |  | 75 | 75 | 75 | 55 |
|  |  | Degree of diffusion | ° | 24 | 24 | 24 | 60 |
|  |  | Surface emission | — | ○ | ○ | ○ | ○ |
|  |  | Surface appearance | — | ○ | ○ | ○ | ○ |

Ex.: Example
pbw: part by weight

TABLE 6

|  |  |  | Unit | C. Ex. 7 | C. Ex. 8 | C. Ex. 9 | C. Ex. 10 | C. Ex. 11 |
|---|---|---|---|---|---|---|---|---|
| Composition | Component A-1 | PC-B15H-a | pbw | 100 | | | | |
| | | PC-B12L-a | pbw | | 100 | 100 | 100 | |
| | | PC-B9H-a | pbw | | | | | |
| | | PC-39L-a | pbw | | | | | |
| | | PC-B7H-a | pbw | | | | | |
| | | PC-B7L-a | pbw | | | | | |
| | | PC-B6H-a | pbw | | | | | 100 |
| | Component A-2 | PC-L1 | pbw | | | | | |
| | Total of component A | | pbw | 100 | 100 | 100 | 100 | 100 |
| | Branching ratio of component A | | mol % | 1.52 | 1.27 | 1.27 | 1.27 | 0.67 |
| | Component B | B-1 | pbw | 0.50 | 0.50 | 0.50 | 10.0 | 0.50 |
| | | B-2 | pbw | | | | | |
| | | B-3 | pbw | | | | | |
| | Component C | C-1 | pbw | 0.024 | 0.024 | 2.00 | 0.024 | 0.024 |
| | | C-2 | pbw | | | | | |
| | Component D | D-1 | pbw | | | | | |
| | | D-2 | pbw | | | | | |
| | | D-3 | pbw | 1.0 | 20.0 | 1.0 | 1.0 | 1.0 |
| | | D-4 | pbw | | | | | |
| | | D-5 | pbw | | | | | |
| | Component E | E-1 | pbw | 0.15 | 0.15 | 0.15 | 0.15 | 0.15 |
| | Component F | F-1 | pbw | 0.002 | 0.002 | 0.002 | 0.002 | 0.002 |
| | Others | PEPQ | pbw | 0.03 | 0.03 | 0.03 | 0.03 | 0.03 |
| | | IRX | pbw | 0.03 | 0.03 | 0.03 | 0.03 | 0.03 |
| | | L1 | pbw | | | | | |
| | | SN3305 | pbw | | | | | |
| Evaluation | Flame retardancy 2.2 mmt | Rating | — | V-0 | V-2 | V-2 | V-0 | V-2 |
| | Flame retardancy 1.5 mmt | Rating | — | V-0 | V-2 | V-2 | V-0 | V-2 |
| | Optical properties 2 mmt | Total light transmittance | % | 75 | 25 | 70 | 50 | 75 |
| | | Diffusion light transmittance | | 75 | 25 | 70 | 50 | 75 |
| | | Degree of diffusion | ° | 24 | 60 | 24 | 24 | 24 |
| | | Surface emission | — | ◯ | X | ◯ | ◯ | ◯ |
| | | Surface appearance | — | X | ◯ | ◯ | X | ◯ |

|  |  |  | Unit | C. Ex. 12 | C. Ex. 13 | C. Ex. 14 | C. Ex. 15 |
|---|---|---|---|---|---|---|---|
| Composition | Component A-1 | PC-B15H-a | pbw | | | | |
| | | PC-B12L-a | pbw | | 100 | 100 | 100 |
| | | PC-B9H-a | pbw | | | | |
| | | PC-B9L-a | pbw | | | | |
| | | PC-B7H-a | pbw | | | | |
| | | PC-B7L-a | pbw | | | | |
| | | PC-B6H-a | pbw | | | | |
| | Component A-2 | PC-L1 | pbw | 100 | | | |
| | Total of component A | | pbw | 100 | 100 | 100 | 100 |
| | Branching ratio of component A | | mol % | 0 | 1.27 | 1.27 | 1.27 |
| | Component B | B-1 | pbw | 0.50 | 0.50 | 0.01 | 0.50 |
| | | B-2 | pbw | | | | |
| | | B-3 | pbw | | | | |
| | Component C | C-1 | pbw | 0.024 | 0.024 | 0.024 | 0.001 |
| | | C-2 | pbw | | | | |
| | Component D | D-1 | pbw | | | | |
| | | D-2 | pbw | | | | |
| | | D-3 | pbw | 1.0 | 0.001 | 1.000 | 1.000 |
| | | D-4 | pbw | | | | |
| | | D-5 | pbw | | | | |
| | Component E | E-1 | pbw | 0.15 | 0.15 | 0.15 | 0.15 |
| | Component F | F-1 | pbw | 0.002 | 0.002 | 0.002 | 0.002 |
| | Others | PEPQ | pbw | 0.03 | 0.03 | 0.03 | 0.03 |
| | | IRX | pbw | 0.03 | 0.03 | 0.03 | 0.03 |
| | | L1 | pbw | | | | |
| | | SN3305 | pbw | | | | |

TABLE 6-continued

| Evaluation | | | | | | | |
|---|---|---|---|---|---|---|---|
| | Flame retardancy 2.2 mmt | Rating | — | V-2 | V-0 | V-2 | V-2 |
| | Flame retardancy 1.5 mmt | Rating | — | V-2 | V-0 | V-2 | V-2 |
| | Optical properties 2 mmt | Total light transmittance | % | 75 | 90 | 75 | 75 |
| | | Diffusion light transmittance | | 75 | 5 | 75 | 75 |
| | | Degree of diffusion | ° | 24 | 0.5 | 24 | 24 |
| | | Surface emission | — | ○ | X | ○ | ○ |
| | | Surface appearance | — | ○ | ○ | ○ | ○ |

C. Ex.: Comparative Example
pbw: part by weight

The Sharpy impact strengths of test specimens obtained from the compositions of Examples 14, 23 and 28 and from the compositions of Examples 34, 36 and 42 were 15 kJ/m², 13 kJ/m², kJ/m², 13 kJ/m², 11 kJ/m² and 12 kJ/m², respectively.

After pellets obtained from the compositions of Example 14, 23 and 28 and from the compositions of Examples 34, 36 and 42 were dried at 120° C. for 6 hours with a hot air circulation drier, lighting covers shown in FIG. 1 were molded from the pellets at a cylinder temperature of 320° C. and a mold temperature of 80° C. by means of the "IS150EN-5Y" injection molding machine of Toshiba Machine Co., Ltd. When the appearance of each of the molded articles was visually checked, it had no short shot or no burn mark.

As obvious from above, the resin composition of the present invention comprises a polycarbonate resin having a branched structure with a branching ratio limited to a narrow range and a flame retardant as the main components and is excellent in transparency and mechanical properties. These characteristic properties are not found in conventional resin compositions. Therefore, the resin composition of the present invention is very useful in various industrial fields such as lighting covers and protective covers for transmission displays as well as OA equipment and electric and electronic equipment and provides an extremely large industrial effect.

EFFECT OF THE INVENTION

Since the resin composition of the present invention comprises an aromatic polycarbonate resin (component A) having a specific range of branching ratio and a flame retardant, it is excellent in transparency and flame retardancy. The resin composition of the present invention has high flame retardancy without containing a bromine-based flame retardant or a phosphorus-based flame retardant which are said to have a large environmental load. Further, even a thin part or a thick part of a molded article of the resin composition can retain transparency. The resin composition of the present invention is also excellent in impact resistance.

INDUSTRIAL APPLICABILITY

The resin composition of the present invention is very useful in various industrial fields such as OA equipment and electric and electronic equipment and provides an extremely large industrial effect.

The invention claimed is:

1. A resin composition comprising;
   (i) 100 parts by weight of an aromatic polycarbonate resin having a branched structure with a branching ratio of 0.7 to 1.1 mol % (component A) and
   (ii) 0.005 to 12 parts by weight of at least one flame retardant selected from the group consisting of a silicone compound having an aromatic group (component B) and an alkali (earth) metal salt (component C).

2. The resin composition according to claim 1, which comprises the component B in an amount of 0.1 to 2 parts by weight based on 100 parts by weight of the component A.

3. The resin composition according to claim 1, wherein the component B is a silicone compound having an Si—H group in the compound.

4. The resin composition according to claim 1, which comprises the component C in an amount of 0.005 to 1.0 part by weight based on 100 parts by weight of the component A.

5. The resin composition according to claim 1, wherein the component C is at least one salt selected from the group consisting of an alkali (earth) metal salt of a perfluoroalkyl-sulfonic acid, an alkali (earth) metal salt of an aromatic sulfonic acid and an alkali (earth) metal salt of an aromatic imide.

6. The resin composition according to claim 1, wherein the flame retardant is a mixture of the silicone compound having an aromatic group (component B) and the alkali (earth) metal salt (component C).

7. The resin composition according to claim 1, which further comprises a light diffusing agent (component D) in an amount of 0.005 to 15.0 parts by weight based on 100 parts by weight of the component A.

8. The resin composition according to claim 7, wherein the component D is a polymer fine particle.

9. The resin composition according to claim 1, which further comprises an ultraviolet absorbent (component E) in an amount of 0.01 to 3 parts by weight based on 100 parts by weight of the component A.

10. The resin composition according to claim 1, which further comprises a fluorescent brightener (component F) in an amount of 0.001 to 0.1 part by weight based on 100 parts by weight of the component A.

11. A molded article comprising the resin composition of claim 1.

12. The molded article according to claim 11, which is a lighting cover having a thickness of a thickest portion of not more than 1.5 mm.

* * * * *